United States Patent [19]

Kawano

[11] Patent Number: 5,531,484
[45] Date of Patent: Jul. 2, 1996

[54] ELBOW PROVIDED WITH GUIDE VANES

[76] Inventor: Michihiko Kawano, 1-1-6-203 Tani, Chuo-ku, Fukuoka-shi, Fukuoka-ken, 810, Japan

[21] Appl. No.: 380,702

[22] Filed: Jan. 30, 1995

[30] Foreign Application Priority Data

Feb. 10, 1994 [JP] Japan .................................. 6-016861

[51] Int. Cl.⁶ .................................................. F16L 41/00
[52] U.S. Cl. ........................ 285/156; 285/176; 285/179; 138/39; 406/191; 406/195
[58] Field of Search ................................. 285/179, 180, 285/181, 183, 156, 176; 138/39; 406/191, 195

[56] References Cited

U.S. PATENT DOCUMENTS

| | | | |
|---|---|---|---|
| 2,216,046 | 9/1940 | Peck | 285/179 X |
| 4,209,192 | 6/1980 | Knight | 285/181 X |
| 4,919,170 | 4/1990 | Kallinich et al. | 138/39 |
| 4,974,881 | 12/1990 | Engel et al. | 285/181 |

FOREIGN PATENT DOCUMENTS

| | | | |
|---|---|---|---|
| 742475 | 10/1943 | Germany | 138/39 |
| 442186 | 2/1936 | United Kingdom | 138/39 |

OTHER PUBLICATIONS

"Hydraulic Losses in Pipes and Ducts", JSME Data Book 1991-11-31, pp. 83-84 (partial English translation—p. 83, right column, line 37 to p. 84, right column, line 9).

Primary Examiner—Dave W. Arola
Attorney, Agent, or Firm—Banner & Allegretti, Ltd.

[57] ABSTRACT

An elbow is provided with guide vanes disposed as to make the shapes of the sub-channels defined thereby similar to each other.

9 Claims, 17 Drawing Sheets

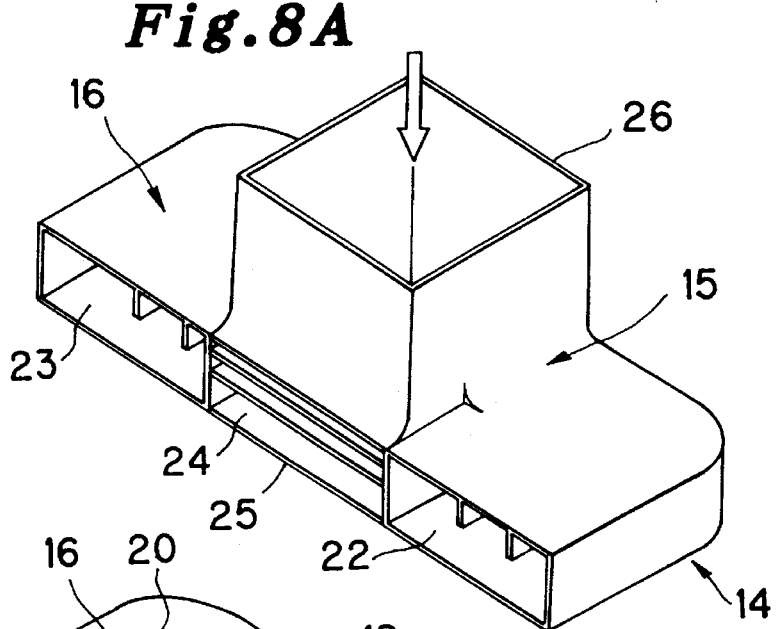
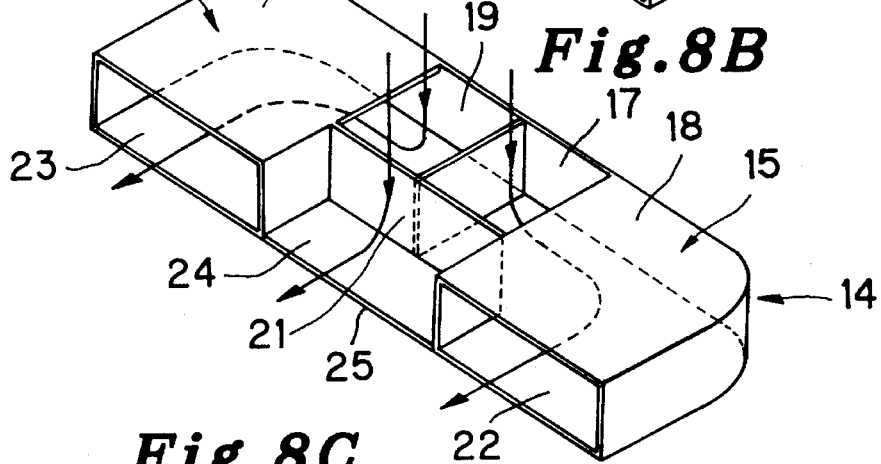
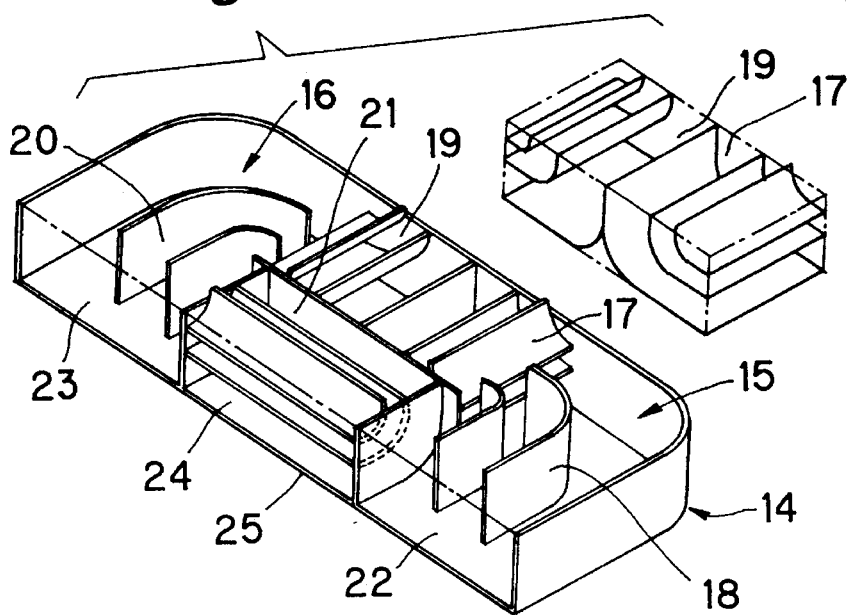

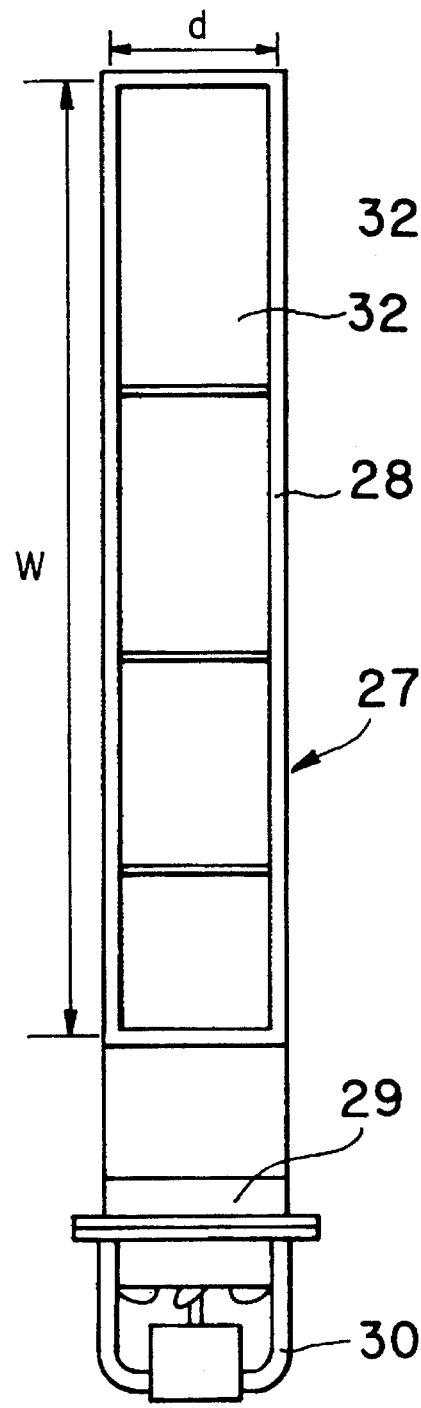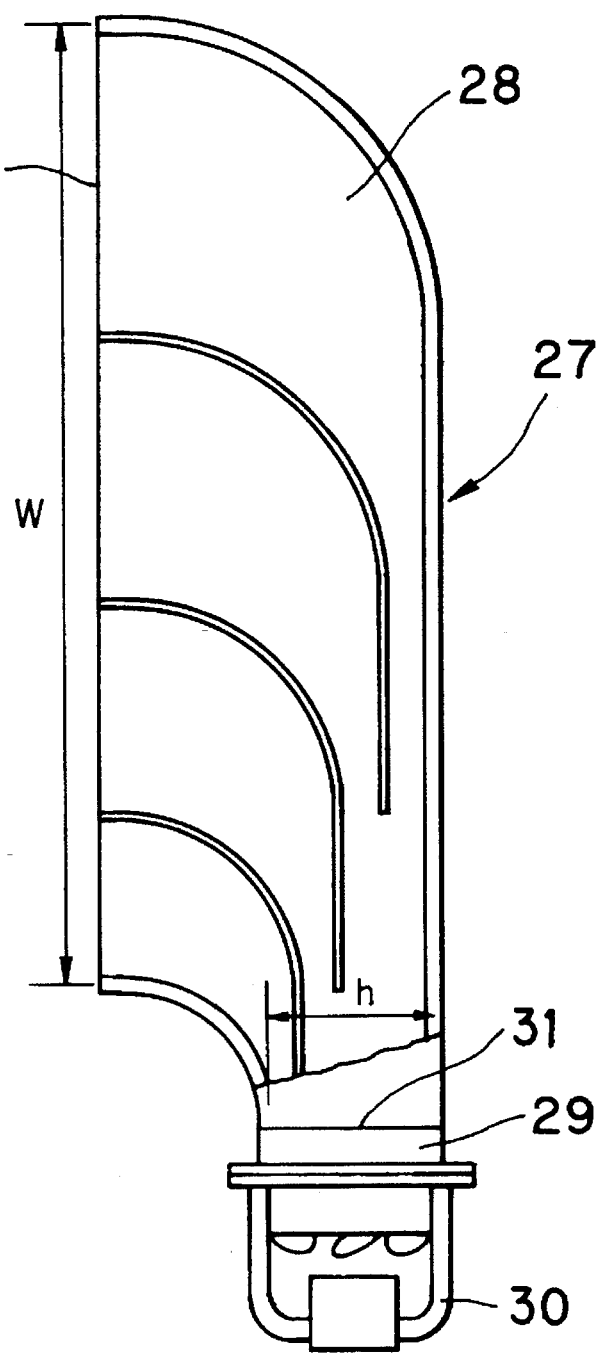

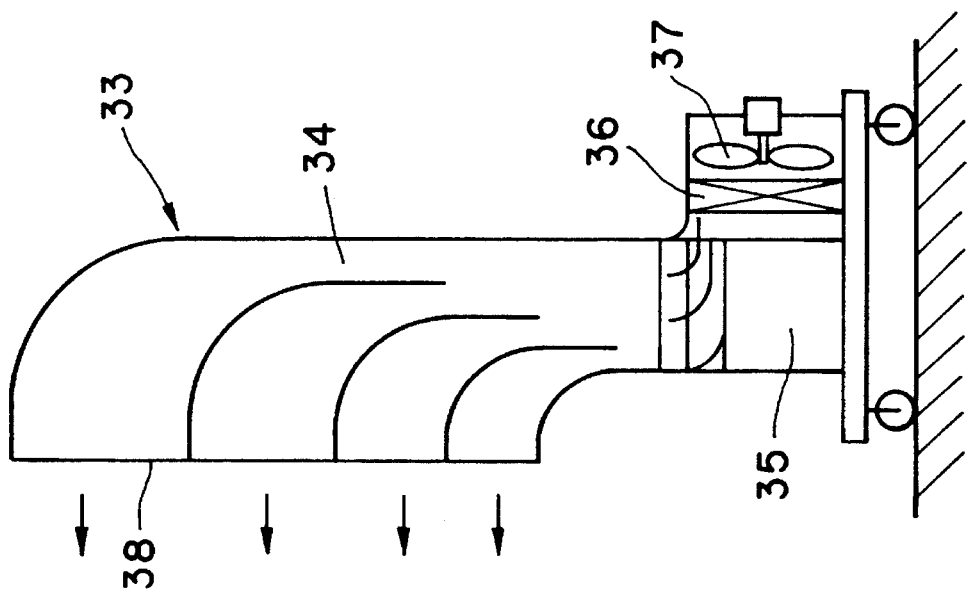
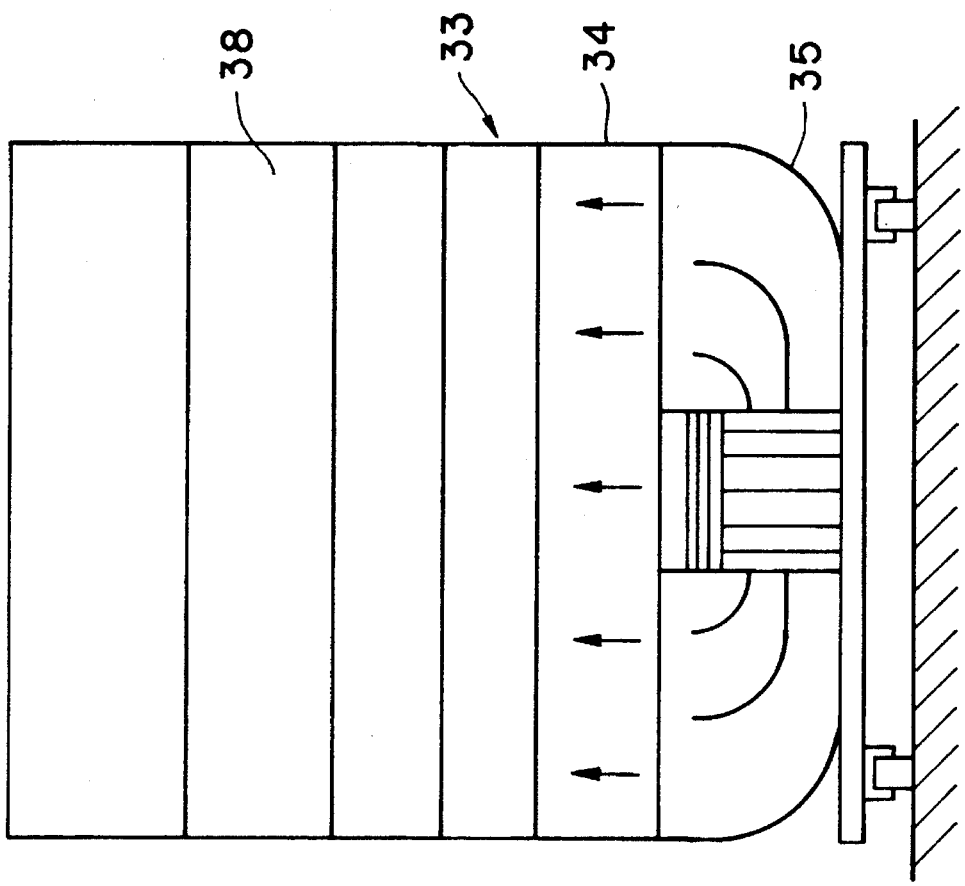

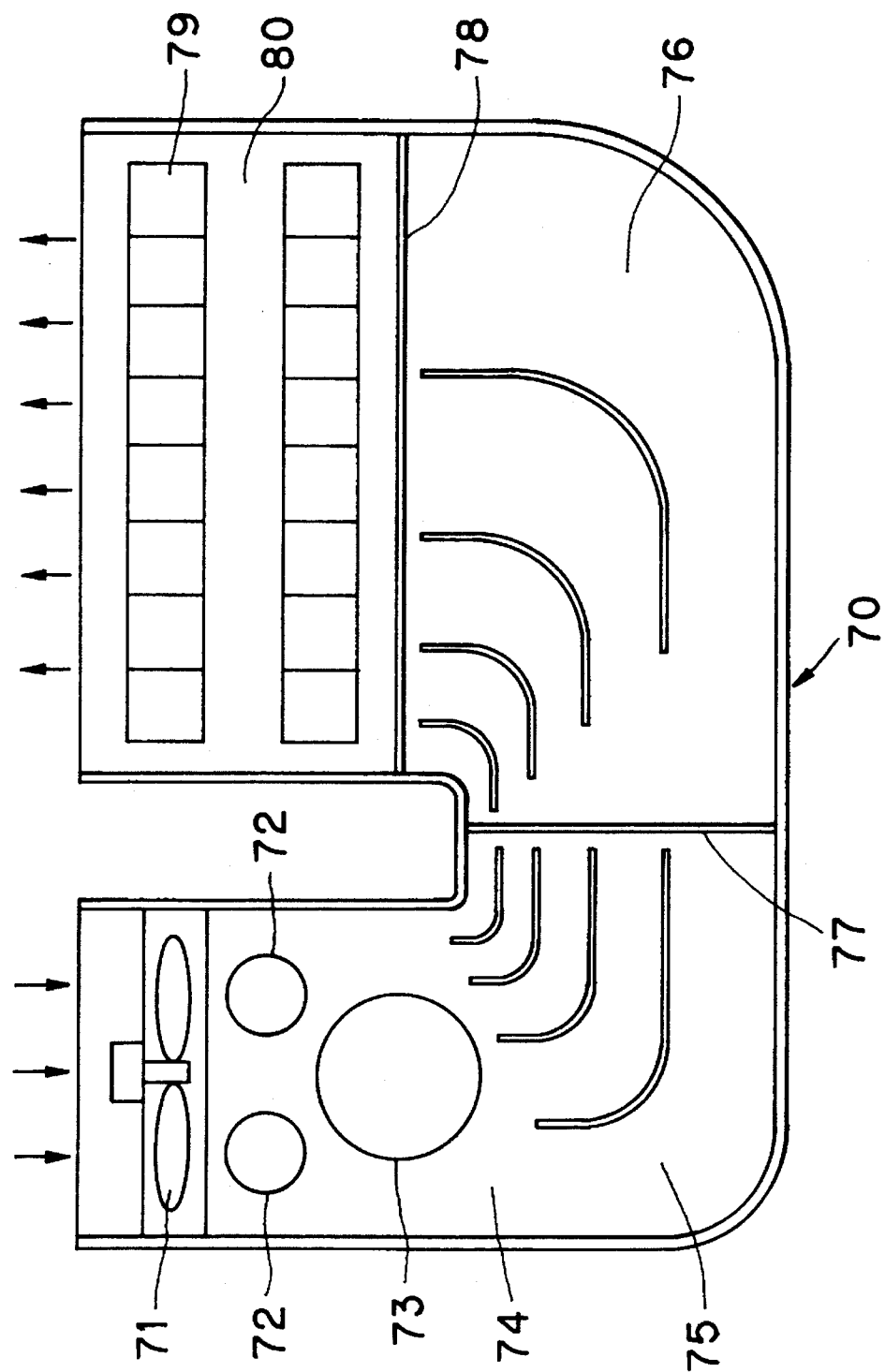

ELBOW PROVIDED WITH GUIDE VANES

BACKGROUND OF THE INVENTION

The present invention relates to an elbow of the expansion, normal, or reduction type which is provided with guide vanes, and is used in a joint or an outlet of a bent duct.

A bent duct with a relatively small radius ratio (the ratio of the radius of curvature of the centerline of the bent duct to the breadth of the bent duct) is called an elbow, while a bent duct with a relatively large radius ratio is called a bend. An elbow usually has a right angled configuration, while a bend usually has a concentric circular arc configuration. The loss of flow (hereinafter, called "flow loss") in a bent duct is the sum of the separation loss due to the separation of the flow near the inner side wall of the bent duct and the friction loss due to the surrounding walls of the bent duct. The separation loss decreases as the radius ratio increases. Thus, it is effective for reduction of the separation loss to provide the bent duct with guide vanes for dividing the bent duct into a plurality of sub-channels whose breadths are small and radius ratios are large.

The bend dividing method, wherein the bend is divided into a plurality of sub-channels as described above, can be easily carried out by inserting one or two guide vanes into the bend along the whole length whereof. However, since the increase of the duct wall area owing to the addition of the guide vanes increases the friction loss, this dividing method can be applied only to bends with relatively small radius ratios.

Elbows, which are simply configured and small in size, are widely used in ducts. The radius ratio of an elbow is small and the separation loss of the elbow is rather large, so that the flow loss of the elbow is rather large. The flow loss of an elbow can be reduced by adopting circular arc shaped inner and outer side walls. If the radius ratio of the inner side wall of an elbow is increased enough to reduce the flow loss to a practical level, however, the shape and the size of the elbow approach those of a bend, so that compactness, which is the advantage of an elbow, is lost.

Flow straightening technologies for use in an elbow are described in the technical data booklet "Flow Resistance of Pipes and Ducts" (The Society of Mechanical Engineering of Japan, 1991), especially on page 84. As flow straightening methods which have been developed, this booklet describes one in which many quarter circular arc shaped guide vanes of rather short length and equal size, are appropriately disposed along the flow lines so as to prevent the generation of vortex flow owing to flow separation (1934, Frey, K.). This method did not come into common use, however, because of the difficulty of determining the flow lines and difficulties in production. Another flow straightening method described involves disposing 15–20 quarter circular arc shaped guide vanes of rather short length and equal size at equal radial intervals or at radial intervals which decrease toward the inner side wall (1946, Salter, C.). However, the method is now used only for certain kinds of bent ducts in wind tunnels, etc., and is not commonly used because of the structural complexity.

The development of the elbows mentioned above has not been followed by the development of a new type of elbow provided with guide vanes which can be applied to all types of elbows: expansion, normal, and reduction.

SUMMARY OF THE INVENTION

An object of the present invention is to provide an elbow provided with guide vanes, wherein the compactness is maintained, the radius ratio at the inner side wall and the outer side wall are as large as those of a bend and the number of the guide vanes is minimized, and which can be equally applied to expansion, normal, and reduction elbows.

According to the present invention, there is provided an elbow provided with guide vanes wherein the guide vanes are disposed to make the shapes of the sub-channels defined thereby similar to each other.

According to a preferred embodiment of the present invention, the shapes of the sub-channels are determined based on the following formulas.

$$P_0 = h / \{[f/(f-r)]^m - 1\} \qquad ①$$

$$a_n = P_0 r [f/(f-r)]^n \qquad ②$$

$$b_n = a_n / f \qquad ③$$

h: inlet breadth of the elbow $P_0$: overhang length of the guide vanes at the outlet of the elbow f: enlargement ratio of the elbow expressed by "outlet breadth/inlet breadth"

r: aspect ratio of the sub-channels (r<f)

m: number of sub-channels $a_n$: outlet breadth of n-th sub-channel ($a_n$ indicates the radius of curvature of the inner side wall when n=0 and indicates the radius of curvature of the outer side wall when n=m)

$b_n$: inlet breadth of n-th sub-channel

According to another preferred embodiment of the present invention, the enlargement ratio "f" is in the range $5 \geq f > 1$.

According to another preferred embodiment of the present invention, the enlargement ratio "f" is 1.

According to another preferred embodiment of the present invention, the enlargement ratio "f" is in the range $1 > f \geq 0.4$ According to another preferred embodiment of the present invention, the sectional shapes of the inlet and the outlet of the elbow are rectangles with the same depth.

According to another preferred embodiment of the present invention, the sectional shapes of the inlet and the outlet of the elbow are circles.

According to another preferred embodiment of the present invention, there is provided an L-shaped elbow comprising two elbows, wherein the elbows are disposed in tandem and the outlet directions of the elbows cross each other at right angles.

According to another preferred embodiment of the present invention, there is provided a T-shaped elbow comprising five elbows, wherein the elbows are disposed in a combination of tandem and parallel.

According to another preferred embodiment of the present invention, the guide vanes are made of panels constituted of heat exchanger pipes.

EFFECT OF THE INVENTION (1) Uniformity of flow velocity

① The flow in a bent duct such as an elbow becomes a free vortex flow wherein RV=constant (R: radius of flow, V flow velocity). Thus, flow velocity near the inner side wall is larger than that near the outer side wall. The flow velocity varies linearly from the outer side wall toward the inner side wall.

② In the present invention, an elbow is divided into a plurality of similarly shaped sub-channels which decrease in size from the sub-channel near the outer side wall of the elbow toward the sub-channel near the inner side wall of the elbow. Thus, the ratio of the side wall length of the sub-channel to the sectional area of the sub-channel increases from that in the sub-channel near the outer side wall of the elbow toward that in the sub-channel near the inner side wall of the elbow. The friction loss of the flow in the sub-channels therefore increases from that in the sub-channel near the outer side wall of the elbow toward that in the sub-channel near the inner side wall of the elbow. On the other hand, the separation losses of the flows in all of the sub-channels are the same because the sub-channels are similar and have the same radius ratio. Thus, the pressure loss in the sub-channels increases from that in the sub-channel near the outer side wall of the elbow toward that in the sub-channel near the inner side wall of the elbow.

③ Owing to ① and ②, in the present invention, the velocity distribution of the flow is made uniform over the section of the elbow if the number "m" of the sub-channels is properly determined. More specifically, in the present invention the flow in the elbow can be straightened if the number "m" of the sub-channels is properly determined. According to the results of experiments carried out by the inventor, the number "m" is desirably 3 to 5.

(2) Relationship between the number "m" of the sub-channels and the size of the elbow An elbow joint, an elbow outlet, etc. are made based on a right-angled elbow. Hereinafter, the right-angled elbow which forms the base of the elbow joint, elbow outlet, etc. is called the base elbow.

The relationship between the number "m" of the subchannels and the size of the elbow in the case where the aspect ratio of the sub-channel "r" is constant, will be described with reference to FIGS. 4A–4C and 5A–5D. FIGS. 4A–4C show normal elbows wherein the enlargement ratio f=1, while FIGS. 5A–5D show expansion elbows wherein the enlargement ratio f=4. In FIG 4A–4C and 5A–5D, the rectangles "abcd" indicate the base elbows. FIGS. 4A and 5A show elbows which have no guide vane and wherein m=1, 4B and 5B show elbows which have one guide vane and wherein m=2, 4C and 5C show elbows which have two guide vanes and wherein m=3, and 5D shows an elbow which has three guide vanes and wherein m =4.

As shown in FIGS. 4A–4C and 5A–5D, the overhang lengths "$P_0$" of the guide vanes rapidly decrease and the sizes of the elbows rapidly decrease as the number increases, and the shapes and the sizes of the elbows approach those of the base elbows "abcd". Particularly, in the expansion elbows shown in FIGS. 5A–5D, the size of the elbow sharply decreases as the number "m" increases, because the base elbow "abcd" is a flat rectangle.

As is obvious from the above, the elbow provided with guide vanes in accordance with the present invention becomes markedly small in size even when its number "m" is rather small, for example 2 to 5. Thus, the elbow provided with guide vanes in accordance with the present invention can be used in confined spaces.

(3) Flow resistance of the elbow and relative static pressure at the inlet of the elbow Dynamic pressure, static pressure, pressure loss, etc. were measured in the elbows with guide vanes in accordance with the present invention and in an conventional elbow. The results are shown in Table 1.

As shown in Table 1, the pressure losses of the elbows provided with guide vanes in accordance with the present invention (elbows No. 2 to 4) are smaller than that of the conventional right-angled elbow without guide vanes (elbow No. 1), because the flows in the elbows in accordance with the present invention are straightened by the guide vanes. As a result, the relative static pressure at the inlet of the elbow ({ static pressure at the inlet of the elbow}–{ static pressure at the outlet of the elbow}) is lower in the elbows in accordance with the present invention (elbows No. 2 to 4) than in the conventional elbow (elbow No. 1). In the case of the expansion elbow in accordance with the present invention, the relative static pressure at the inlet of the elbow becomes zero when the enlargement ratio "f" is approximately equal to 2. That is, the apparent resistance becomes zero when the enlargement ratio "f" is approximately equal to 2. When the enlargement ratio "f" of the elbow is greater than 2, the relative static pressure at the inlet of the elbow, or the apparent resistance becomes negative. The inventor confirmed that the relative static pressure at the inlet of the elbow becomes zero when the enlargement ratio "f" is approximately equal to 2, regardless of the flow velocity in the elbow.

As is clear from the forgoing, the relative static pressure at the inlet of the elbow in accordance with the present invention is lower than that in the conventional elbow. Thus, the elbow in accordance with the present invention can contribute greatly to energy saving in various kinds of plants, air conditioners, etc.

(4) Relationship between the aspect ratio "r" of the sub-channel and the outlet angle.

In FIG. 1, the aspect ratios "r" of the sub-channels are $A_1A_2/A_1C_1, A_2A_3/A_2C_2, A_3A_4/A_3C_3, A_4A_5/A_4C_4$. In accordance with the present invention, $A_1A_2/A_1C_1=A_2A_3/A_2C_2=A_3A_4/A_3C_3=A_4A_5/A_4C_4$.

The relationship between the aspect ratio "r" of the sub-channel and the outlet angle is shown in FIGS. 6A to 6E. In FIGS. 6A to 6E, the inlet flow and the outlet flow are indicated by the arrows. The aspect ratio "r" of the sub-channel becomes larger in the order of 6A, 6B, 6C, 6D. The sign of the outlet angle is shown in FIG. 6E. As shown in FIGS. 6A to 6D, the outlet angle varies in the order of (–), (0), (+) as the aspect ratio "r" of the sub-channel becomes larger. The outlet angle can be varied in the range of –10° to +40°. The relationship between the aspect ratio "r" of the sub-channel and the outlet angle can be determined experimentally.

The ability to generate an oblique outlet flow is a required characteristic for the outlet of a side window defroster used in an automobile, open showcase, ordinary air curtain, etc.

(5) The maximum value of the enlargement ratio "f"

Experiments carried out by the inventor show that the maximum value of the enlargement ratio "f" of the elbow in accordance with the present invention which is able to ensure uniformity of the velocity distribution of the outlet flow is 5. When the enlargement ratio "f" becomes larger than 5, the uniformity of the velocity distribution of the outlet flow is no longer maintained.

It is said that the distance X over which air blown from a nozzle maintains uniform velocity distribution is nearly equal to 2.5D (D: the diameter of the outlet of the nozzle). In the elbow in accordance with the present invention, the air blows into a channel surrounded by three walls (two side walls and one rear wall opposite to the inlet of the elbow), so that, the diffusion of the air flow in the elbow is restrained. Thus, the distance X becomes longer in the elbow than in the open air. As a result, the uniformity of the velocity distribution of the flow at the inlets of the sub-channels is maintained even if the enlargement ratio "f" of the elbow becomes as large as 5 and the distances between the inlet of the elbow and the inlets of the sub-channels become larger than 2.5h (h: inlet breadth of the elbow). As pointed out in section (1), the uniformity of the velocity distribution of the flow in the elbow is maintained in the sub-channel region. Thus, in the elbow in accordance with the present invention, the uniformity of the velocity distribution of the outlet flow is maintained even if the enlargement ratio "f" of the elbow becomes as large as 5.

When the enlargement ratio "f" of the elbow becomes equal to or smaller than 0.4, the overhang length "$P_0$" of the guide vane becomes very large. Thus, the advantage of the present invention that the elbow is divided into sub-channels, whereby the overhang length "$P_0$" of the guide vane is made short and the elbow is made compact, is lost.

As a result, in the elbow in accordance with the present invention, the practical range of the enlargement ratio "f" of the elbow is $5 \geq f > 0.4$.

BRIEF DESCRIPTION OF THE DRAWINGS

In the drawings:

FIGS. 8A, 8B and 8C are perspective views of a T-shaped elbow in accordance with the third embodiment of the present invention, 8A showing the external appearance, 8B the arrangement of internal sections in the elbow, and 8C the arrangement of guide vanes.

FIG. 9A is a side sectional view and FIG. 9B is a front view of a blowoff unit in accordance with the fourth embodiment of the present invention, FIG. 10A is a side sectional view and e 10B is a front sectional view of a blowoff unit in accordance with the fifth embodiment of the present invention, FIG. 15 is a plan sectional view of a laver sheet dryer in accordance with the tenth embodiment of the present invention.

DETAILED DESCRIPTION OF THE PREFERRED EMBODIMENTS

[I] 1st embodiment

The method for disposing guide vanes in an elbow so as to divide the elbow into a plurality of similarly shaped sub-channels will be described with reference to an expansion elbow shown in FIG. 1.

Figure 1:
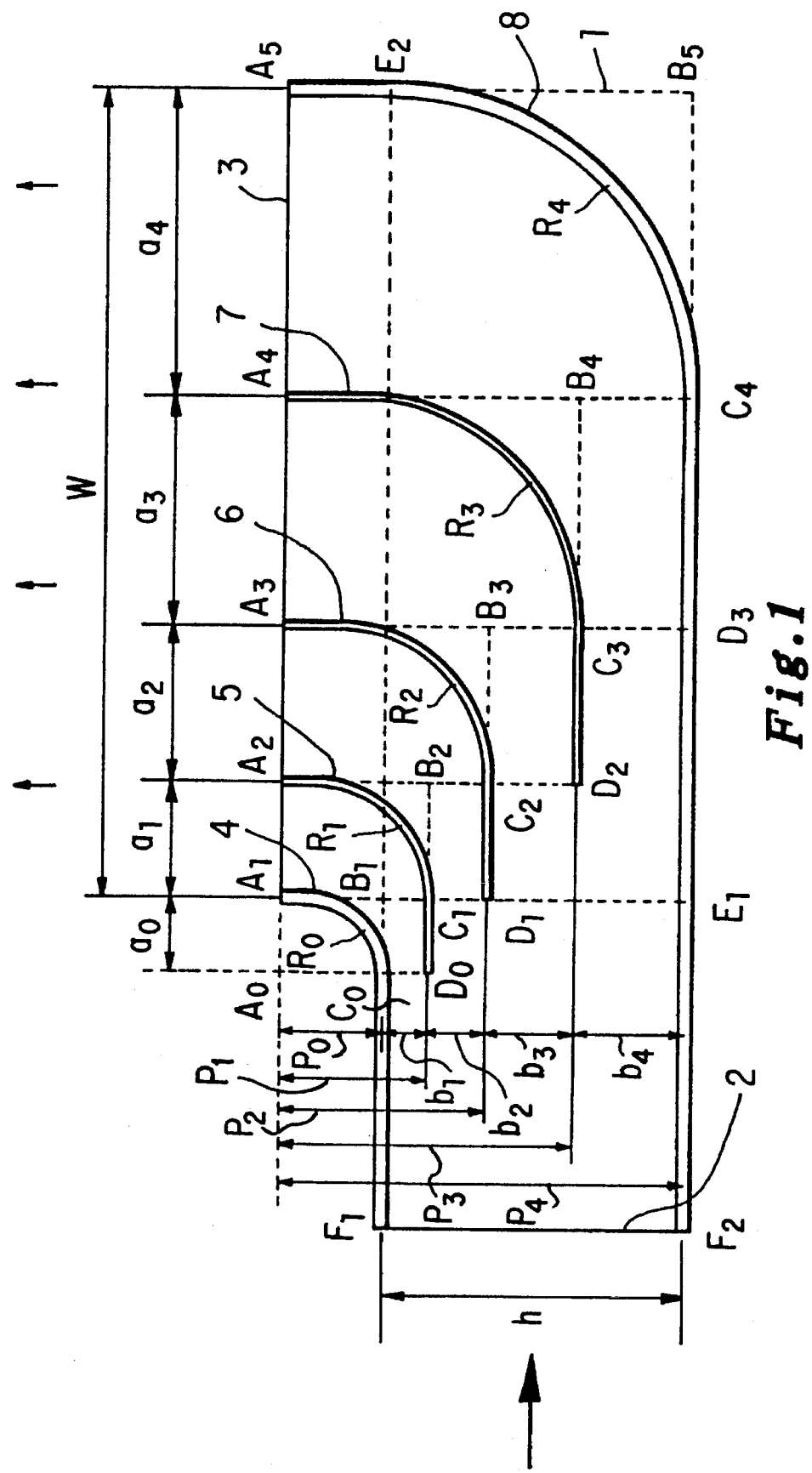
FIG 1 is a side sectional view of an expansion elbow with constant depth provided with guide vanes in accordance with the first embodiment of the present invention.

(1) Derivation of formulas for obtaining the overhang length "$P_0$" of the guide vanes at the outlet of the elbow, the outlet breadth "$a_n$" of n-th sub-channel ($a_n$ indicates the radius of curvature of the inner side wall when n=0 and indicates the radius of curvature of the outer side wall when n=m), and the inlet breadth "$b_n$" of n-th sub-channel In FIG 1, reference numeral 1 indicates a base elbow "$B_1E_2B_5E_1$", 2 indicates guide vane No. 1, 6 indicates the outlet of the elbow, 4 indicates the inner side wall of the elbow, 5 indicates guide vane No.1, 6 indicates guide vane No.2, 7 indicates guide vane No.3, and 8 indicates the outer side wall of the elbow. In FIG. 1, reference letter "W" indicates outlet breadth of the elbow, and "h" indicates inlet breadth of the elbow.

The sub-channels defined in the elbow are similar to each other. Thus, the enlargement ratio "f" of the elbow is expressed as follows.

$$f = W/h = (a_1 + a_2 + a_3 + \ldots)/(b_1 + b_2 + b_3 + \ldots) = a_1/b_1 = a_2/b_2 = a_3/b_3 = \ldots = a_n/b_n$$

The rectangle lengths "$P_n$" of the sub-channels are expressed as follows.

$$P_1 = P_0 + b_1,\ P_2 = P_0 + b_1 + b_2,\ P_3 = P_0 + b_1 + b_2 + b_3,\ P_n = P_0 + b_1 + b_2 + b_3 + \ldots + b_n$$

The aspect ratio "r" of the sub-channels is expressed as follows.

$$r = a_0/p_0 = a_1/p_1 = a_2/p_2 = a_3/p_3 = \ldots = a_n/p_n$$

From the above equations, the following formulas are derived for obtaining the overhang length "$P_0$" of the guide vanes at the outlet of the elbow, the outlet breadth "$a_n$" of n-th sub-channel, and the inlet breadth "$b_n$" of n-th sub-channel based on given values of the inlet breadth "h", the outlet breadth "W", the number of sub-channels "m" and the aspect ratio "r" of the sub-channels.

$$P_0 = h/\{[f/(f-r)]^m - 1\} \qquad \text{①}$$

$$a_n = P_0 r[f/(f-r)]^n \qquad \text{②}$$

$$b_n = a_n/f \qquad \text{③}$$

(2) Disposition of the guide vanes, inner side wall and outer side wall

Based on the overhang length "$p_o$" of the guide vanes at the outlet of the elbow, the outlet breadth "$a_n$" of n-th sub-channel, and the inlet breadth "$b_n$" of n-th sub-channel, which are obtained from the formulas ① to ③, rectangles $A_0A_1B_1C_0$, $A_1A_2B_2C_1$, $A_2A_3B_3C_2$, $A_3A_4B_4C_3$, $A_4A_5B_5C_4$ are determined, as shown in FIG. 1.

Circular arcs "$R_0$", "$R_1$", "$R_2$", "$R_3$", "$R_4$" which respectively touch lines $C_0B_1A_1$, $C_1B_2A_2$, $C_2B_3A_3$, $C_3B_4A_4$, $C_4B_5A_5$ as well as points $C_0$, $C_1$, $C_2$, $C_3$, $C_4$ are determined as shown in FIG. 1.

The line $B_2C_1$ is extended by a length equal to that of the line $B_1C_0$ so as to determine a line $C_1D_0$. The line $B_3C_2$ is extended by a length equal to that of the line $B_2C_1$ so as to determine a line $C_2D_1$. The line $B_4C_3$ is extended by a length equal to that of the line $B_3C_2$ so as to determine a line $C_3D_2$. The line $B_5C_4$ is extended by a length equal to that of the line $B_4C_3$ so as to determine a line $C_4D_3$. The line $B_1C_0$ is extended by an appropriate length so as to determine a line $C_0F_1$. The line $D_3E_1$ is extended by a length equal to that of the line $B_1F_1$ so as to determine a line $E_1F_2$.

Thus, guide vanes $D_0C_1A_2$, $D_1C_2A_3$, $D_2C_3A_4$, inner side wall $F_1C_0A_1$ and outer side wall $F_2D_3C_4A_5$ are determined.

As a result, there is obtained an expansion elbow provided with guide vanes in accordance with the present invention, which define sub-channels $C_0A_1A_2D_0$, $C_1A_2A_3D_1$, $C_2A_3A_4D_2$, $C_3A_4A_5D_3$ that are similar to each other.

Figure 2:
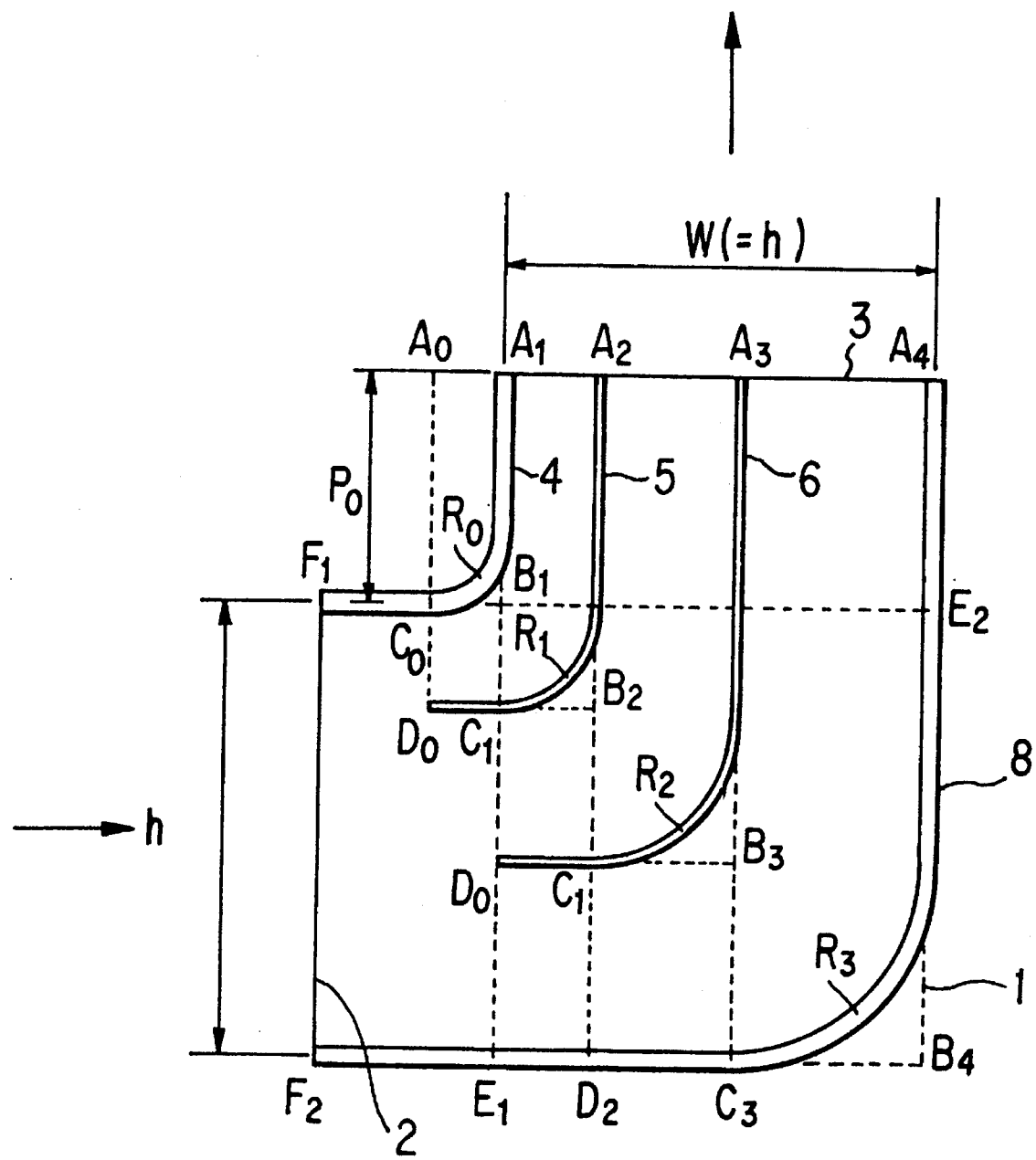
FIG. 2 is a side sectional view of a normal elbow with constant depth provided with guide vanes in accordance with the first embodiment of the present invention.

A normal elbow, with an enlargement ratio f=1, determined in the same way as described above is shown in FIG. 2. In FIG. 2, the same elements and points are indicated by the same reference numerals and letters as those in FIG. 1.

Figure 3:
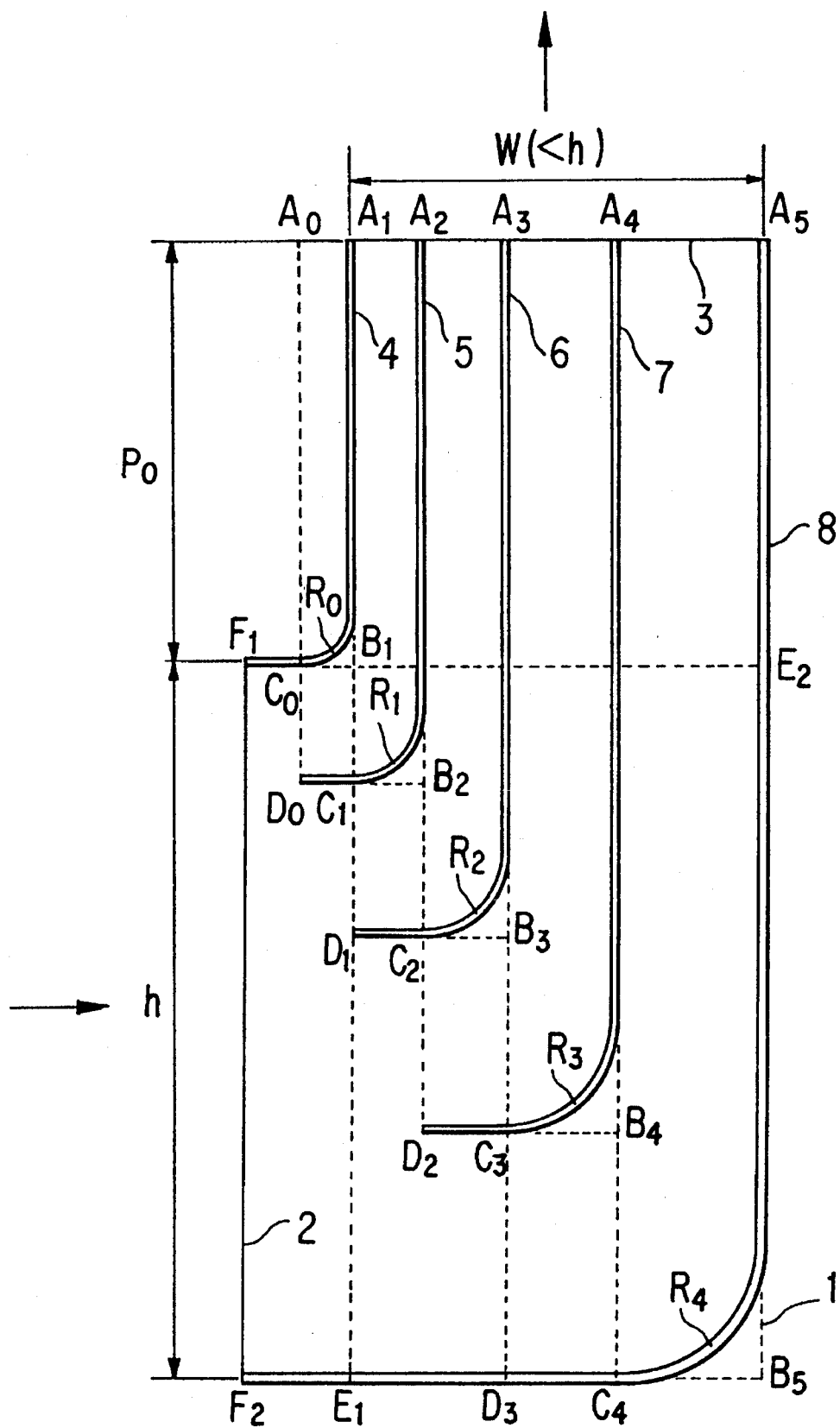
FIG. 3 is a side sectional view of a reduction elbow with constant depth provided with guide vanes in accordance with the first embodiment of the present invention.
Figure 4A:
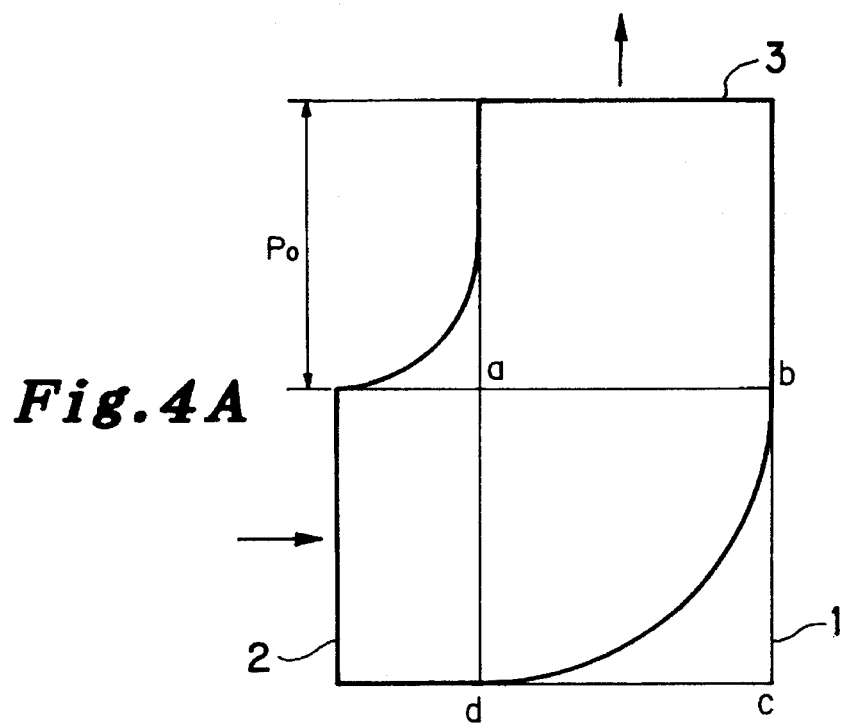
FIGS. 4A, 4B and 4C are side sectional views of normal elbows, the elbows of FIG. 4B and 4C being provided with guide vanes in accordance with the present invention, which illustrate the relationship between the number "m" of sub-channels and the size of the elbow.
Figure 4B:
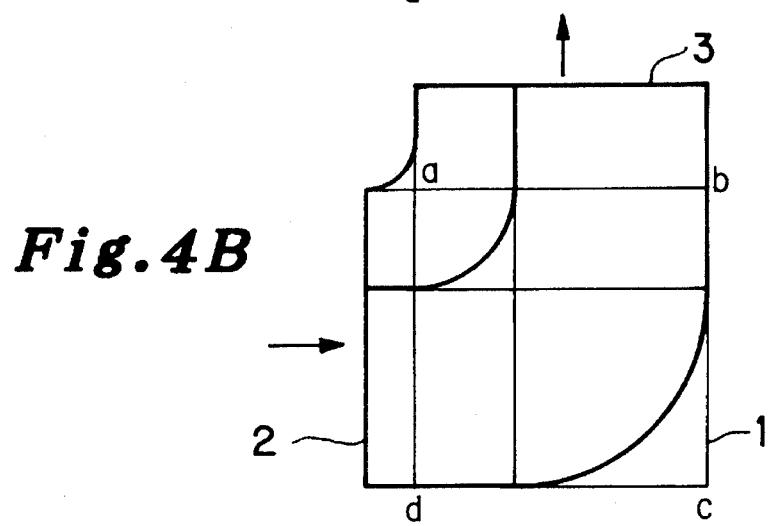
Figure 4C:
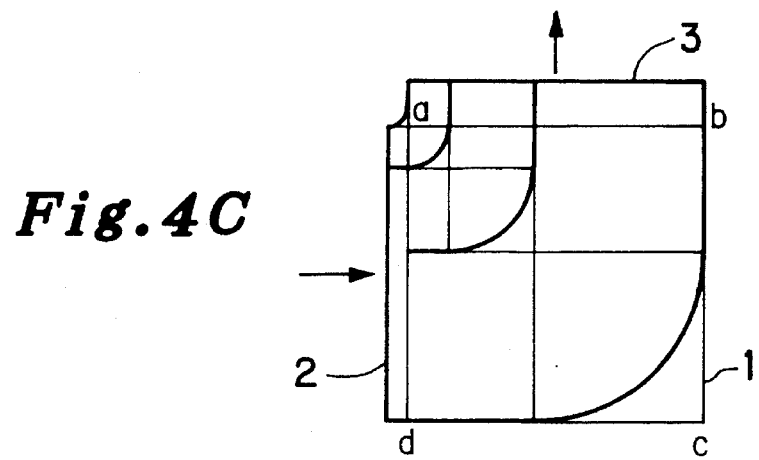
Figure 5A:
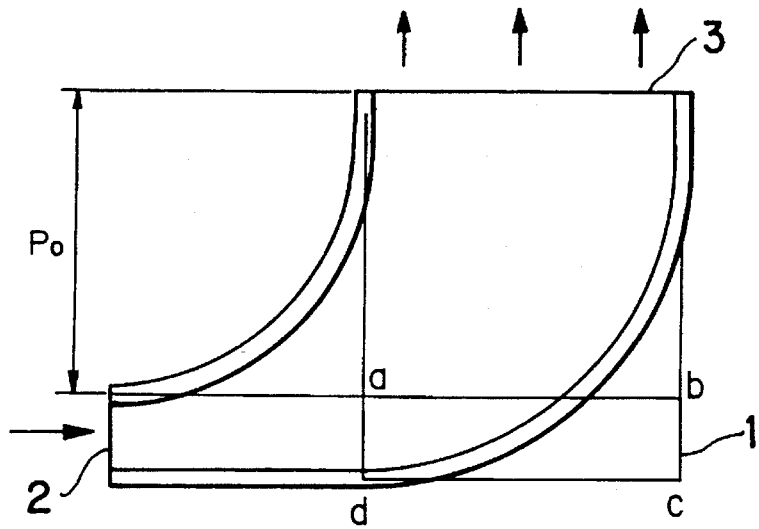
FIGS. 5A, 5B 5C and 5D are side sectional views of expansion elbows, the elbows of FIGS. 5B, 5C and 5D being provided with guide vanes in accordance with the present number "m" of the sub-channels and the size of the elbow invention, which illustrate the relationship between the FIGS. 6A, 6B, 6C, 6D and 6E are side sectional views of expansion elbows provided with guide vanes in accordance with the present invention, which illustrate the relation between the aspect ratio "r" of the sub-channel and the outlet angle.
Figure 5B:
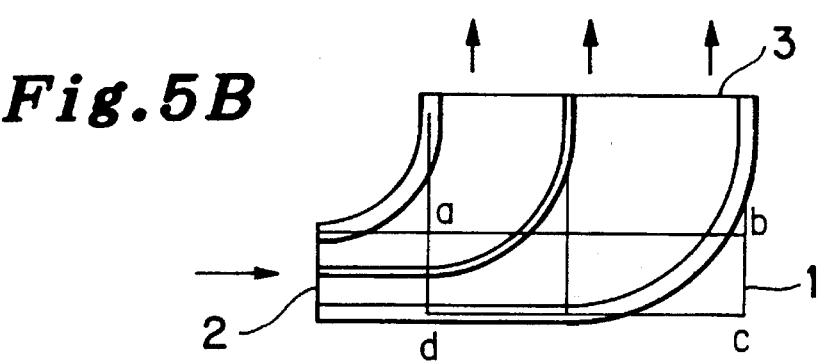
Figure 5C:
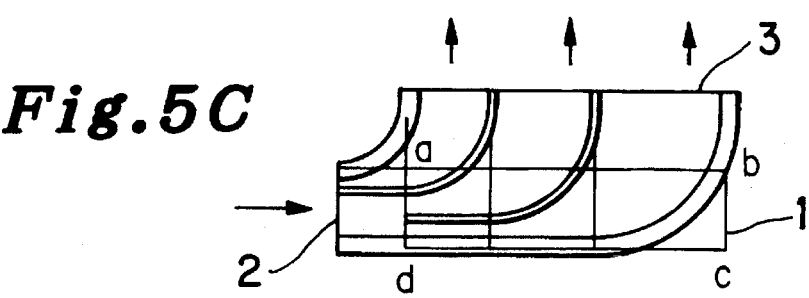
Figure 5D:
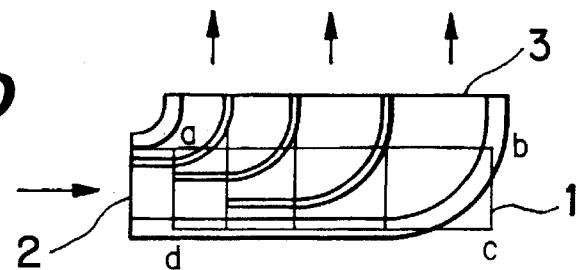

A reduction elbow, with an enlargement ratio f=0.5, determined in the same way as described above is shown in FIG. 3. In FIG. 3, the same elements and points are indicated by the same reference numerals and letters as those in FIG. 1.

Sectional shapes of the inlet 2 and the outlet 3 of the elbows are rectangles with the same depth or circles. Circular sectional shapes are adopted when high pressurized fluid is passed through the elbow. Otherwise, rectangular sectional shapes are adopted.

[II] 2nd embodiment

Figure 7:
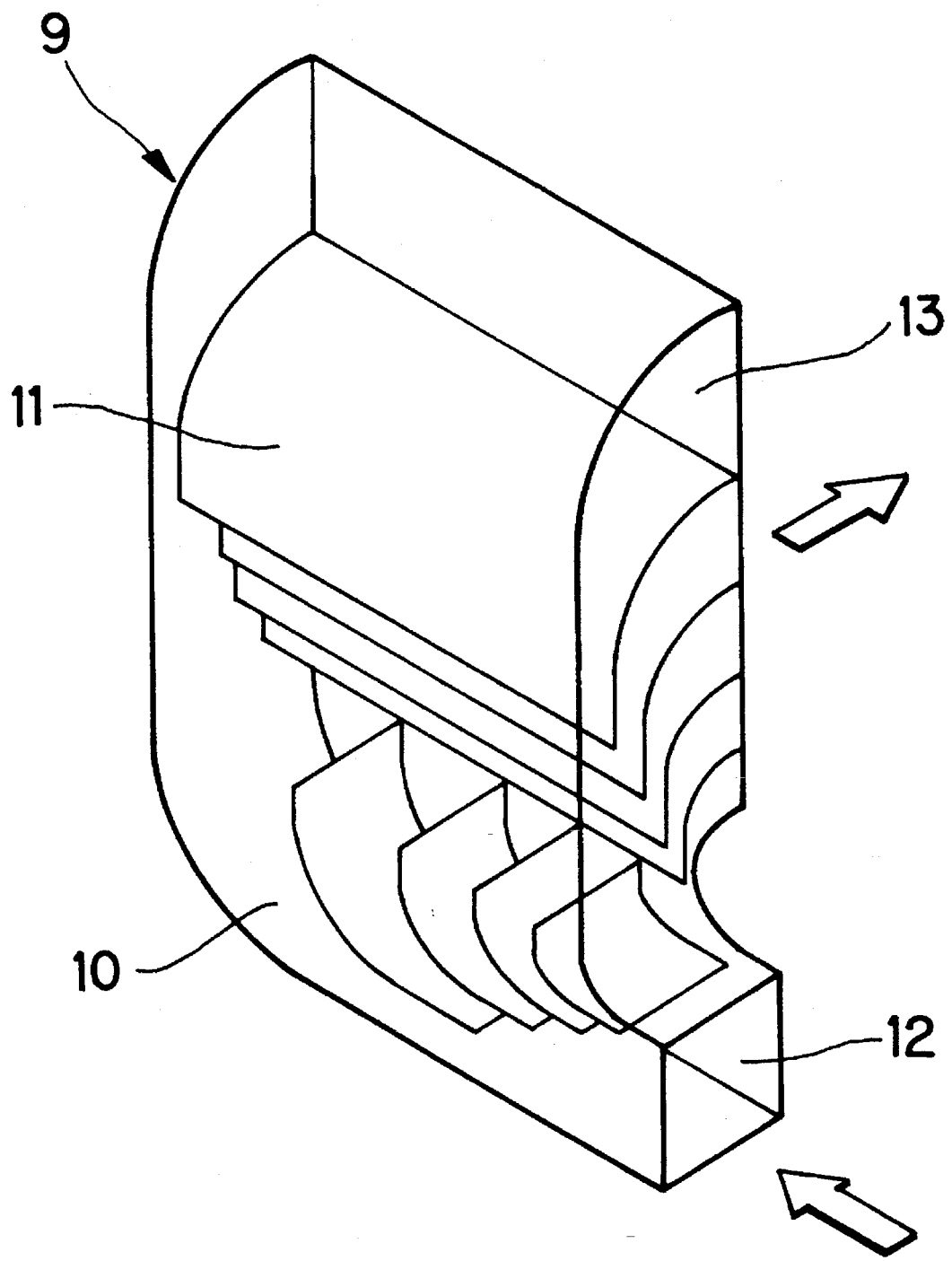
FIG. 7 is a perspective view of an L-shaped elbow in accordance with the second embodiment of the present invention.

FIG. 7 shows an L-shaped elbow 9 assembled from two expansion elbows provided with guide vanes in accordance with the present invention. The L-shaped elbow 9 includes a first expansion elbow 10 having an inlet 12 and a second expansion elbow 11 having an outlet 13. The elbows 10, 11 are constructed in accordance with the present invention. The second elbow 11 is connected to the first elbow 10 in tandem. The outlet directions and the streamline of the fluid flow of the elbows 10, 11 cross each other at right angles. As mentioned earlier, the maximum value of the enlargement ratio "f" of the elbow provided with guide vanes in accordance with the present invention is 5. Thus, the maximum value of the enlargement ratio of the L-shaped elbow 9 is 5×5=25. Owing to its very large enlargement ratio, the L-shaped elbow 9 is useful as an inlet member of an automobile air conditioning unit, an inlet member of an electric dust collector, etc.

[III] 3rd embodiment

FIGS. 8A—8C show a T-shaped elbow 14 assembled from five elbows provided with guide vanes in accordance with the present invention.

As shown in FIG. 8C, the T-shaped elbow 14 includes a pair of L-shaped elbows 15, 16 which are symmetrically disposed adjacent to each other in the transverse direction. The L-shaped elbow 15 has two elbows 17, 18 which are connected in tandem. The L-shaped elbow 16 has two elbows 19, 20 which are connected in tandem. An elbow 21 is disposed between the L-shaped elbows 15, 16. The outlets 22, 23 and 24 of the L-shaped elbows 15, 16 and the elbow 21 are formed into a flat rectangular shape and are directed in the same direction. The outlets 22, 23, 24 form the outlet 25 of the T-shaped elbow 14

An inlet duct 26 of square sectional shape is connected to the inlets of the L-shaped elbows 15, 16, and the elbow 21.

In the T-shaped elbow 14, the air flows into the L-shaped elbows 15, 16 and the elbow 21 from the inlet duct 26. The air which flows into the L-shaped elbow 15 flows out from the outlet 22. The air which flows into the L-shaped elbow 16 flows out from the outlet 23. The air flows in the L-shaped elbows 15, 16 are symmetrical to each other. The air which flows into the elbow 21 flows out from the outlet In the T-shaped elbow 14, the uniformity of the velocity distribution of the outlet flow is ensured, because the uniformity of the velocity distribution of the outlet flow is ensured at the outlets 22, 23 and 24 by the fact that the elbows 17, 18, 19, 20, 21 are constructed in accordance with the present invention, and the air flows in the L-shaped elbows 15, 16 are symmetrical to each other.

As is clear from the above, the T-shaped elbow 14 can convert an inlet air flow of square sectional shape into an outlet air flow of flat rectangular sectional shape whose velocity distribution is uniform. The T-shaped elbow 14 is very useful as a flow straightening member for an air curtain unit, wind boxes for various kinds of equipment, a blowoff unit, etc.

It is possible to design an asymmetric T-shaped elbow wherein the ratio of the inlet area of the L-shaped elbow 15 to the inlet area of the L-shaped elbow 16 is the same as that of the outlet area of the L-shaped elbow 15 to the outlet area of the L-shaped elbow 16.

[IV] 4th embodiment

FIGS. 9A and 9B show a blowoff unit 27 assembled from an elbow provided with guide vanes in accordance with the present invention, a straightening grid, and a ventilating fan.

As shown in FIGS. 9A and 9B, the blowoff unit 27 includes an expansion elbow 28 provided with guide vanes, a straightening grid 29 and a ventilating fan 30. The expansion elbow 28 is constructed in accordance with the present invention. The straightening grid 29 and the ventilating fan 30 are connected to the inlet 31 of the expansion elbow 28.

In the blowoff unit 27, vortex air flow generated by the ventilating fan 30 is straightened when it passes through the straightening grid 29. The air flow deprived of its swirling velocity component is led into the expansion elbow 28 and flows out from the expansion elbow 28 as a straightened and expanded air flow.

The depth "d" of the outlet 32 of the elbow 28 is the same as the diameter of the ventilating fan 30. The breadth "W" of the outlet 32 of the elbow 28 may be determined freely except that the maximum value of the breadth "W" is 5 times of the breadth "h" of the inlet 31. Since, as shown in Table 1, the pressure loss of the elbow provided with guide vanes in accordance with the present invention is very small, the air capacity of the blowoff unit 27 is substantially equal to the maximum nominal capacity of the ventilating fan 30. Thus, a high speed outlet air flow is ensured in the blowoff unit 27. For example, when a ventilating fan measuring 60 cm in diameter is used, and the enlargement ratio is set as f=4, the velocity of the outlet air is 3 m/sec.

Thus, owing to the low energy consumption, low noise level and simple structure, the blowoff unit 27 is very useful as a blowoff member for an air curtain unit, a stand-up fan, a blowoff member for a scavenging unit, etc.

[V] 5th embodiment

FIGS. 10A and 10B show a blowoff unit 33 assembled from an expansion elbow 34 provided with guide vanes in accordance with the present invention, a T-shaped elbow 35 including a pair of elbows provided with guide vanes in accordance with the present invention, a straightening grid 36 and a ventilating fan 37.

In the blowoff unit 33, vortex air flow generated by the ventilating fan 37 is straightened when it passes through the straightening grid 36. The air flow deprived of its swirling velocity component is led into the T-shaped elbow 35. When the air flow passes through the T-shaped elbow 35, the cross section of the air flow is converted into a flat rectangular shape. Then, the air flow is led into the expansion elbow 32. When the air flow passes through the expansion elbow 32, the cross section of the air flow is converted into a large square shape. Then, the air flow blows out of the outlet 38 of the expansion elbow 34 as a straightened air flow.

Since the air flow generated by an ordinary ventilating fan includes a swirling velocity component, it cannot travel far. Moreover it throws up dust. The air flow generated by the blowoff unit 33 is a laminar flow which does not include a swirling velocity component. Thus, the blowoff unit 33 is very useful as a ventilator for scavenging contaminated dusty and smoky air from a room. The blowoff unit 33 is very useful also as an ordinary ventilator used in a working space.

[VI] 6th embodiment

Figure 11A:
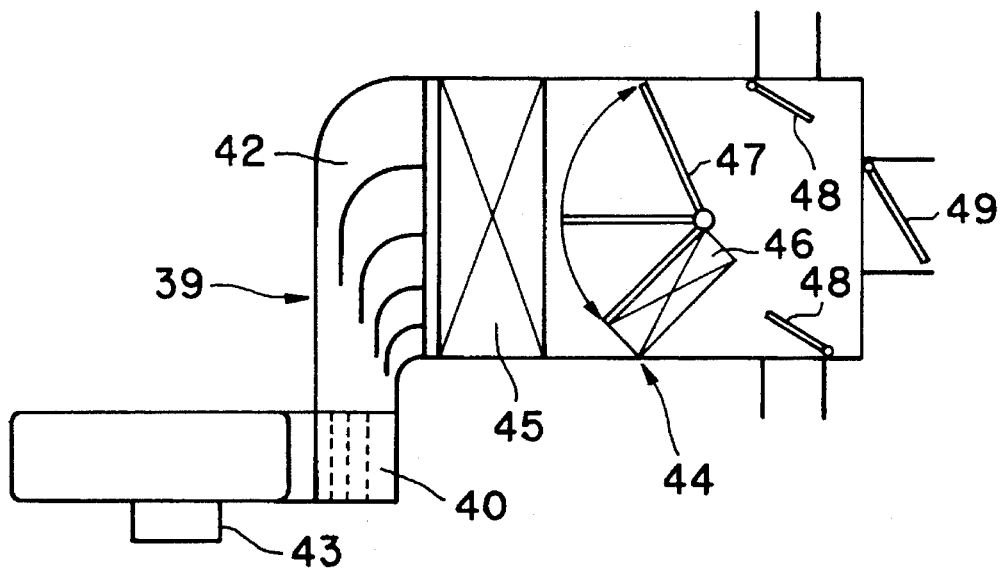
FIG. 11A is a plan sectional view and FIG 11B is a perspective view of an automobile air conditioning unit in accordance with the sixth embodiment of the present invention.
Figure 11B:
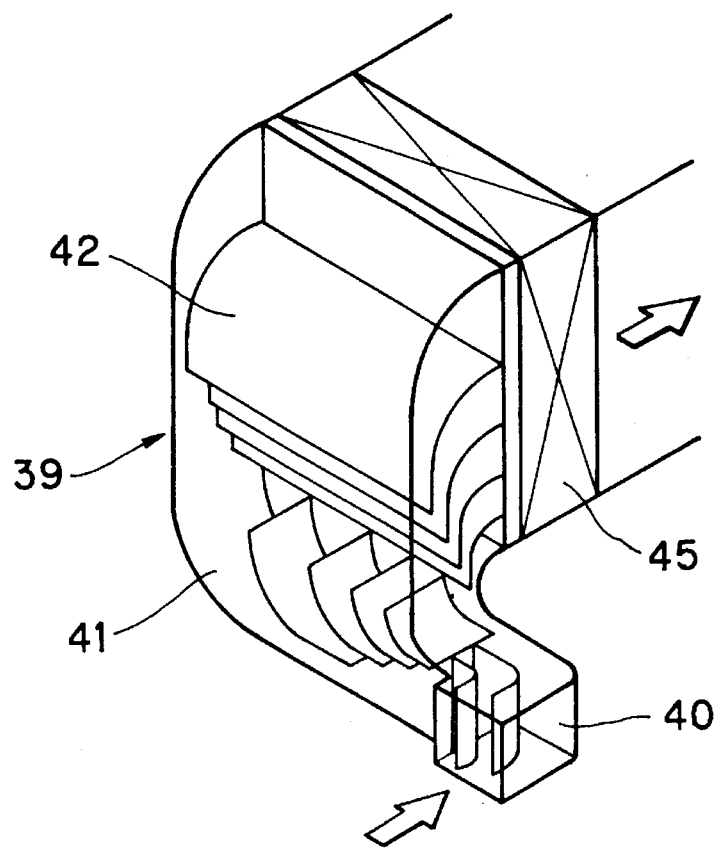

FIGS. 11A and 11B show an automobile air conditioning unit 39 which includes an L-shaped elbow assembled from a pair of elbows 40, 41 provided with guide vanes in accordance with the present invention, and an elbow provided with guide vanes in accordance with the present invention.

A very high velocity air flow generated by a sirocco fan 43 is led into the elbow 40. The air flow is abruptly expanded when it passes through the elbows 40–22. Then the abruptly expanded air flow is led into the air conditioning section 44 of the air conditioning unit 39. The air flow is cooled or heated by a cooler 45 or a heater 46. The temperature of the air flow is controlled by an air mix damper 47. The air flow is led into a passenger compartment of the car through dampers 48, 49.

In an air conditioning unit, high speed outlet air flow from a sirocco fan must be decelerated down to one-tenth of the initial speed. Thus, the sectional area of the cooler 45 becomes ten times the sectional area of the outlet of the sirocco fan 43. Since the engine compartment in which the air conditioning unit is installed has limited space, an abrupt expansion duct is usually disposed between the sirocco fan 43 and the cooler 45. Since the conventional abrupt expansion ducts cannot generate an outlet air flow with uniform velocity distribution, the cooler 45 is exposed to uneven air flow. Thus, the heat exchange effectiveness decreases, pressure loss increases and noise is generated.

The abrupt expansion elbow assembly including the elbows 40–42 can generate an outlet air flow with uniform velocity distribution at low pressure loss. Thus, the abrupt expansion elbow assembly including the elbows 40–42 is very useful as an abrupt expansion duct for an automobile air conditioning unit, etc.

[VII] 7th embodiment

Figure 12A:
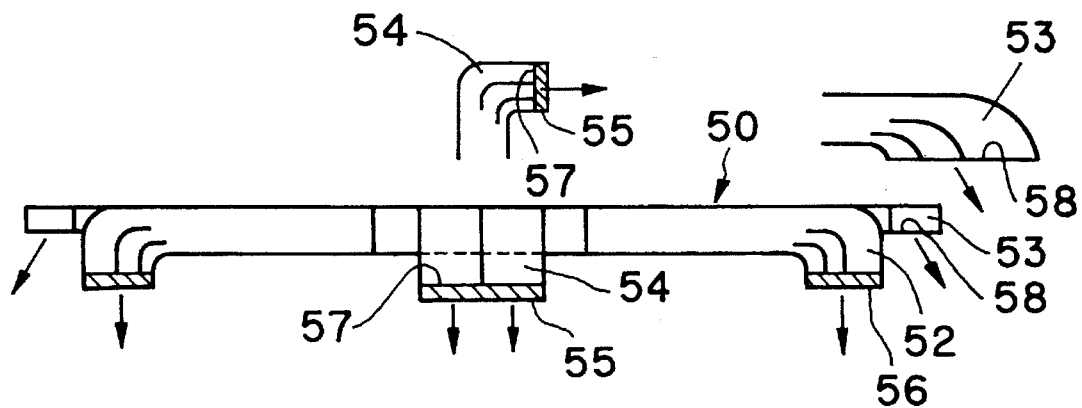
FIG. 12A is a plan sectional view and FIG 12B is a front sectional view of a dash board air outlet of an automobile in accordance with the seventh embodiment of the present invention.
Figure 12B:
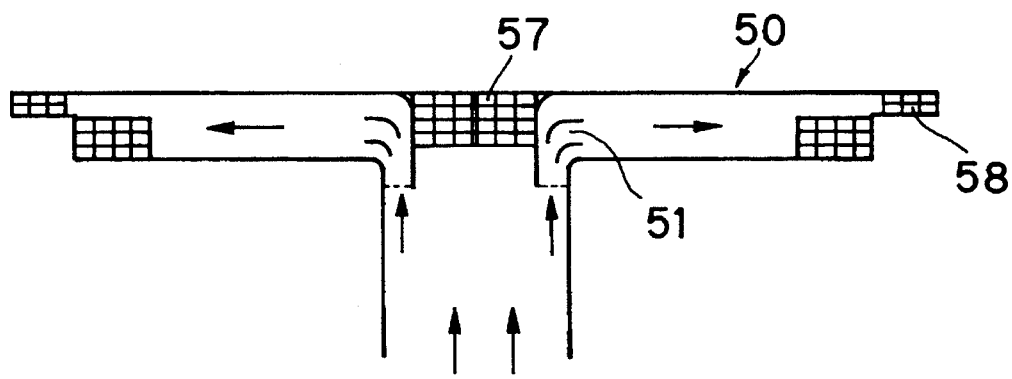

FIGS. 12A, 12B show an automobile dash board air outlet 50 which includes elbows 51, 52, 53 and 54 provided with guide vanes in accordance with the present invention.

Figure 6A:
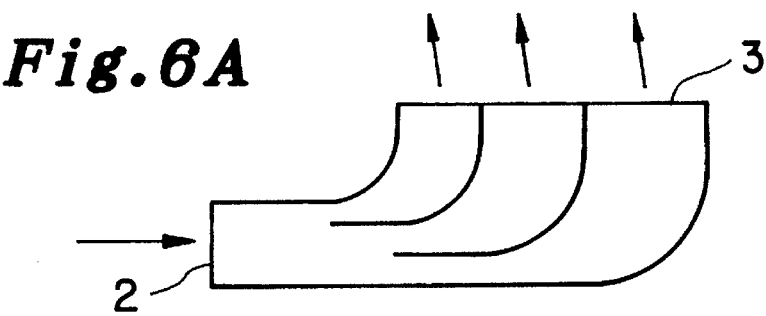
Figure 6B:
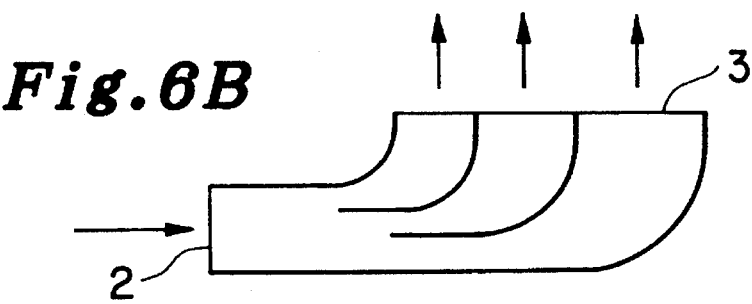
Figure 6C:
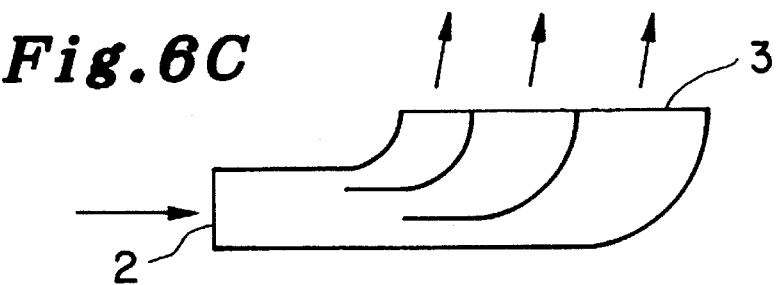
Figure 6D:
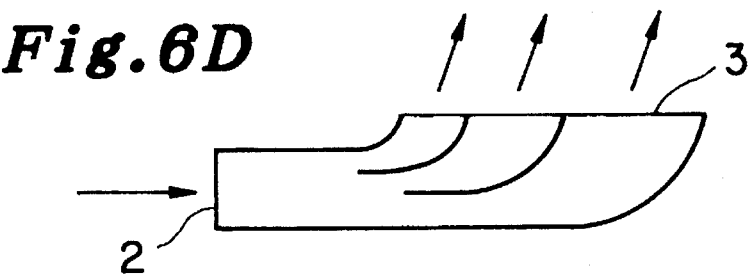
Figure 6E:
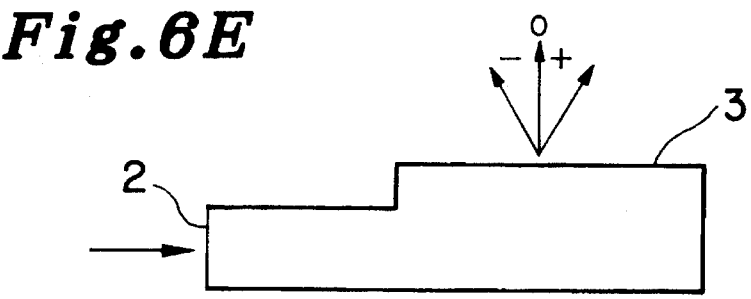

In the conventional automobile dash board air outlet, the direction of the outlet air is controlled only by louvers 55, 56, so that the outlet air flow becomes turbulent and cannot advance straightforward. As the elbow provided with guide vanes in accordance with the present invention generates the outlet air flow which can advance straightforward, the outlet air flow from the center outlet 57 can adequately air-condition the rear seat portion of the passenger compartment. The elbow 53, which forms the outlet 58 of a side window defroster, can be constituted by the elbow shown in FIG. 6D which generates an oblique outlet flow. Thus, the efficiency of the side window defroster is enhanced. The dash board air outlet 50 contributes to energy saving in the air conditioning of the car because the pressure loss of the dash board air outlet 50 is very low.

[III] 8th embodiment

Figure 13:
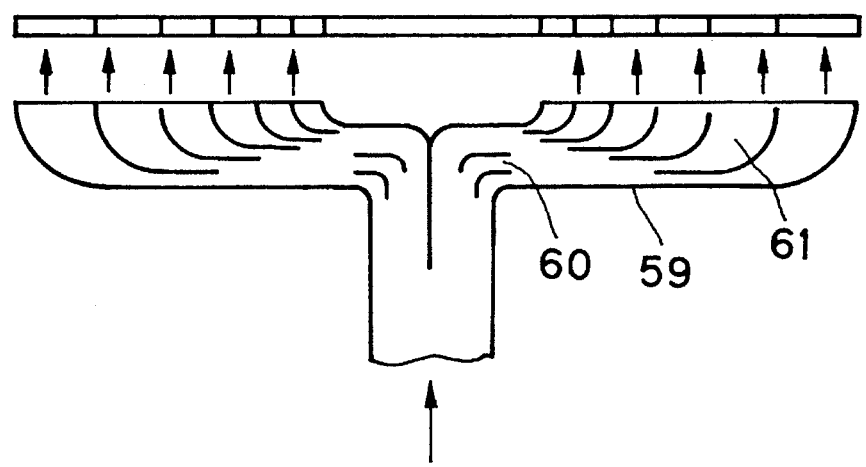
FIG. 13 is a front sectional view of a windshield defroster of an automobile in accordance with the eighth embodiment of the present invention.

FIG. 13 shows an automobile windshield defroster 59 which includes elbows 60, 61 provided with guide vanes in accordance with the present invention.

The windshield defroster 59 can generate a warm air flow with a uniform velocity distribution over the length of the outlet. Thus, the windshield defroster 59 can achieve high efficiency.

[IX] 9th embodiment

Figure 14:
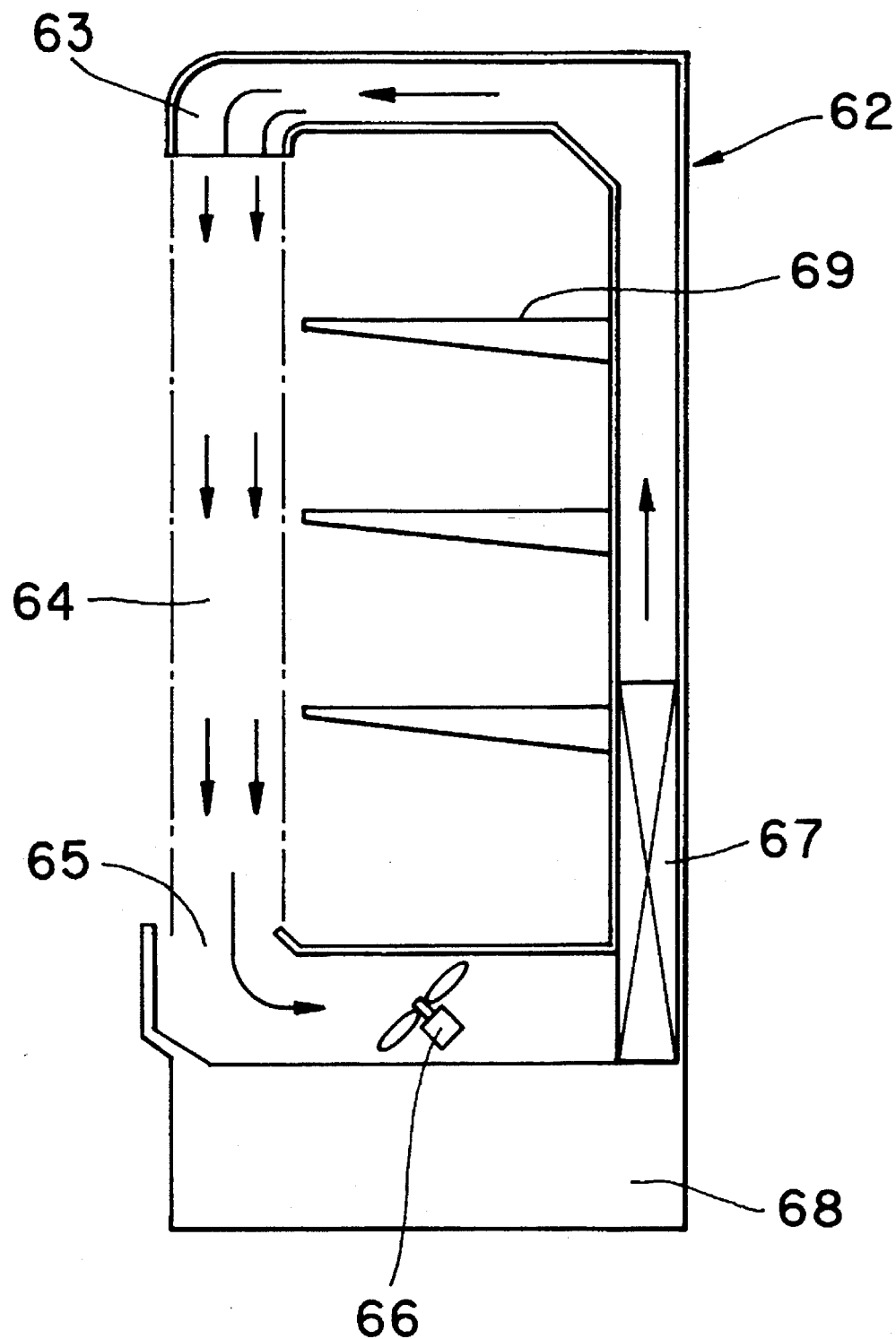
FIG. 14 is a side sectional view of an open showcase in accordance with the ninth embodiment of the present invention.

FIG. 14 shows an open showcase 62 which has an air curtain 64 whose outlet 63 is constituted by an elbow provided with guide vanes in accordance with the present invention, an air inlet 65, a fan 66, a cooler 67, a machinery space 68 and shelves 69.

The air curtain of the conventional open showcase uses a honeycomb outlet made of plastic. This honeycomb outlet is disadvantageous owing to high pressure loss, easy blockage by dust, frost, etc., and easy deterioration of its material, and is therefore a cause of wasted blowing fan energy and maintenance difficulties.

On the other hand, the outlet using the elbow provided with guide vanes in accordance with the present invention has such advantages as uniform outlet flow velocity distribution, low pressure loss, low susceptibility to blockage by dust, frost, etc., and long material service life (the elbow in accordance with the present invention has a simple structure so that it can be made from metal materials such as aluminum).

Thus, the open showcase 62 reduces loss of energy by the fan 66, lowers production cost, and ensures easy maintenance.

The inventor confirmed that the open showcase 62 can generate an air curtain 64 able to maintain a cool atmosphere in the showcase 62 with high efficiency.

[X] 10th embodiment

FIG. 15 shows a laver sheet dryer 70 which has a ventilating fan 71, stack shafts 72, a furnace 73, a chamber 74 which accommodates the ventilating fan 71, the stack shafts 72 and the furnace 73, elbows 75, 76 provided with guide vanes in accordance with the present invention, perforated panels 77, 78 with large opening ratios and low pressure losses, draining boards 79 for supporting wet laver sheets, and a drying chamber 80 which accommodates the draining boards 79 and driving equipment for moving the draining boards 79.

In the laver sheet dryer 70, it is necessary to supply the wet laver sheets placed on the draining boards 79 with a high speed air flow, the velocity distribution whereof is uniform and the temperature whereof is not so high, so as to maintain the quality of the laver sheets.

In the laver sheets dryer 70, a warm air flow generated in the chamber 72 is straightened when it passes through the elbows 75, 76 and the perforated panels 77, 78. Then, the straightened air flow with uniform velocity distribution is led into the drying chamber 80 so as to rapidly dry the wet laver sheets on the draining boards 79.

Even if a commercially available ventilating fan with ordinary power is used as the ventilating fan 79 in the laver sheet dryer 70, an air flow with a high enough velocity to rapidly dry the wet laver sheets on the draining boards 79 can be delivered into the drying chamber 80 because the pressure losses of the elbows 75, 76 and the perforated panels 77, 78 are very low.

[XI] 11th embodiment

Figure 16A:
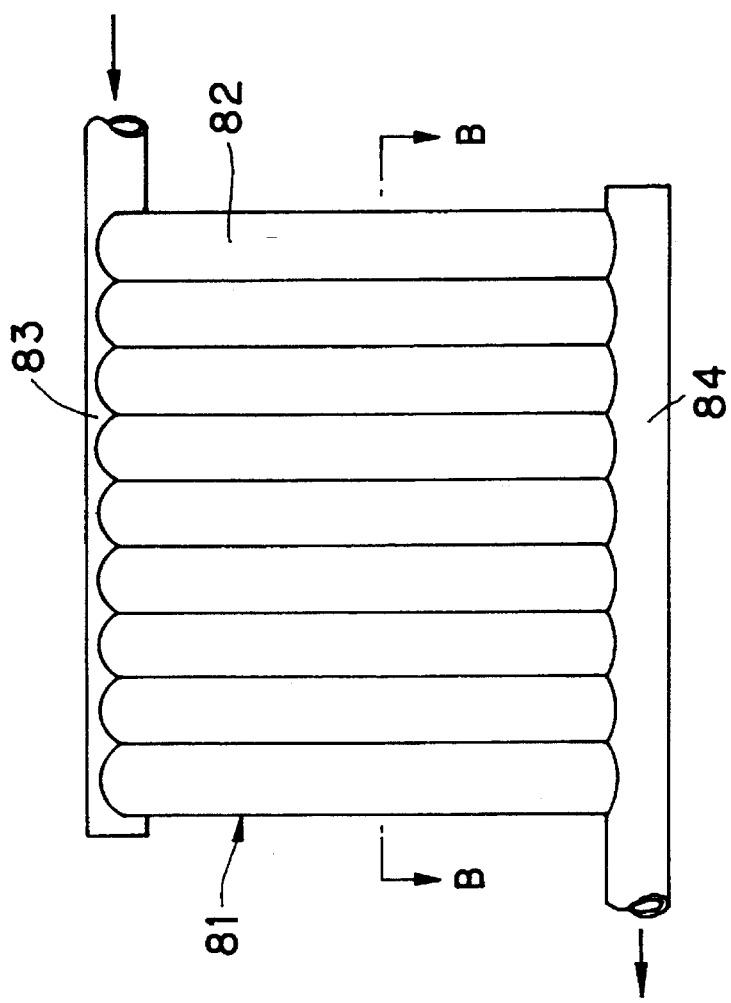
FIG. 16A is a front view e 16B is a sectional view along the line B—B of FIG. 16A
Figure 16B:
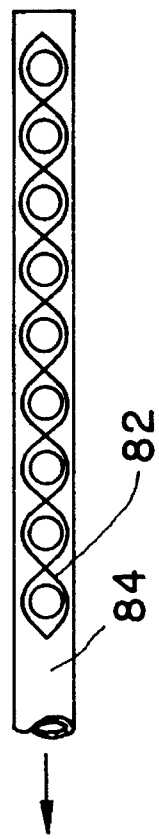
FIG. 16C is a side view of a guide vane used in an elbow provided with guide vanes in accordance with the eleventh embodiment of the present invention.
Figure 16C:
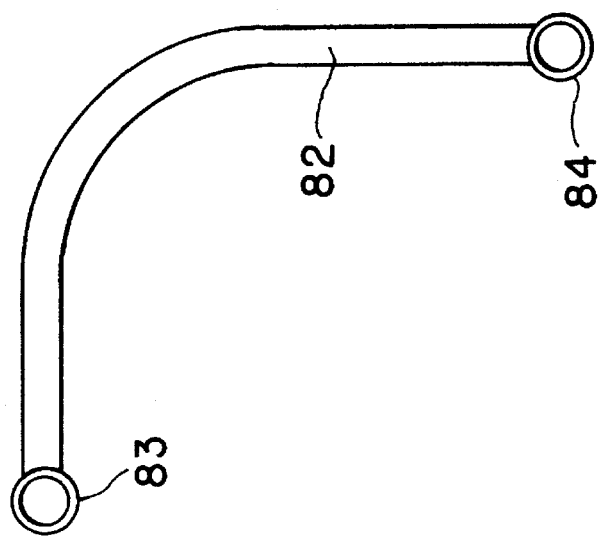

FIGS. 16A, 16B and 16C show a guide vane 81 for cooling high temperature gas, which is used in an elbow in accordance with the present invention.

The guide vane 81 has heat exchanger tubes 82 provided with fins and welded together into a heat exchanger panel, a header pipe 83 connected to one end of the heat exchanger panel, and a header pipe 84 connected to the other end of the heat exchanger panel. Heat exchange medium such as water or high-pressure-steam is passed through the guide vane 81. An elbow which includes a plurality of guide vanes 81 is used in a large-sized boiler, heat exchanger, etc so as to enhance their efficiencies.

[XII] 12th embodiment

Figure 17:
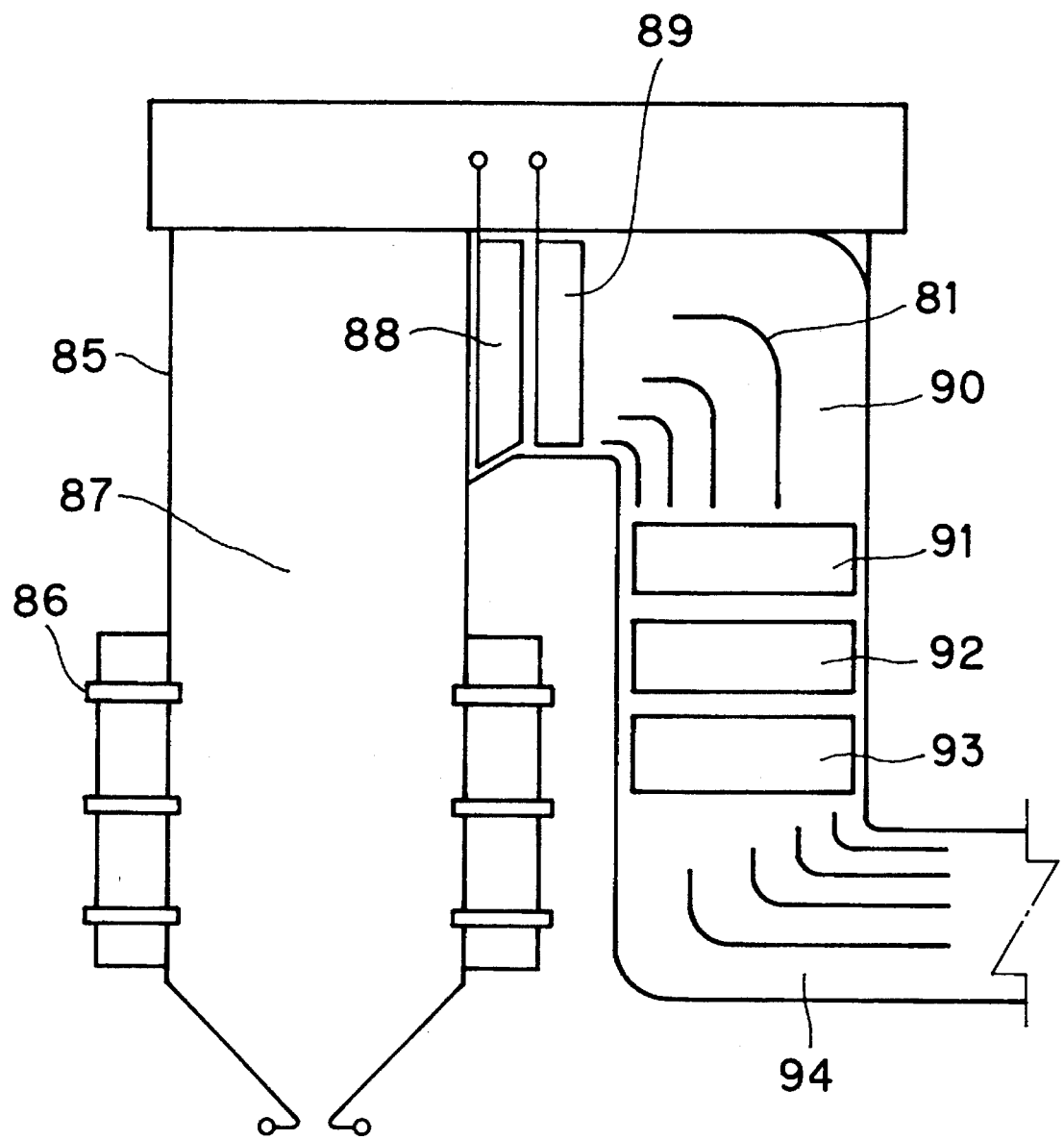
FIG. 17 is a front sectional view of a boiler in accordance with the twelfth embodiment of the present invention.

FIG. 17 shows a large-sized boiler 85 which has a burner 86, a furnace 87, a superheater 88 and a reheater 89 disposed in a horizontal flue, an elbow 90 provided with a plurality of guide vanes 81 of the 11th embodiment for cooling high temperature gas, a horizontal superheater 91, a horizontal reheater 92 and a fuel economizer 93 which are disposed in a vertical duct, and an elbow 94 provided with guide vanes made of heat resistant steel plates.

In the conventional boiler, since no straightener is disposed in the elbow where the flue is bent at a right angle, a strong vortex flow is generated there. Thus, the horizontal superheater located at the outlet of the elbow is exposed to a flow of combustion gas having an uneven velocity distribution. As a result, the heat exchange is hindered, pressure loss of the combustion gas is high, and the efficiency of the boiler is low.

In the boiler 85 of the present embodiment, since the elbow 90 provided with a plurality of guide vanes 81 of the 11th embodiment for cooling the high temperature gas and the elbow 94 provided with guide vanes made of heat resistant steel plates are disposed at the bend portions of the flue, the generation of vortex flow is prevented, heat exchange by the heat exchangers 91, 92 is promoted, pressure loss of the combustion gas decreases, and the construction and running costs of the boiler are reduced.

[XIII] 13th embodiment

Figure 18:
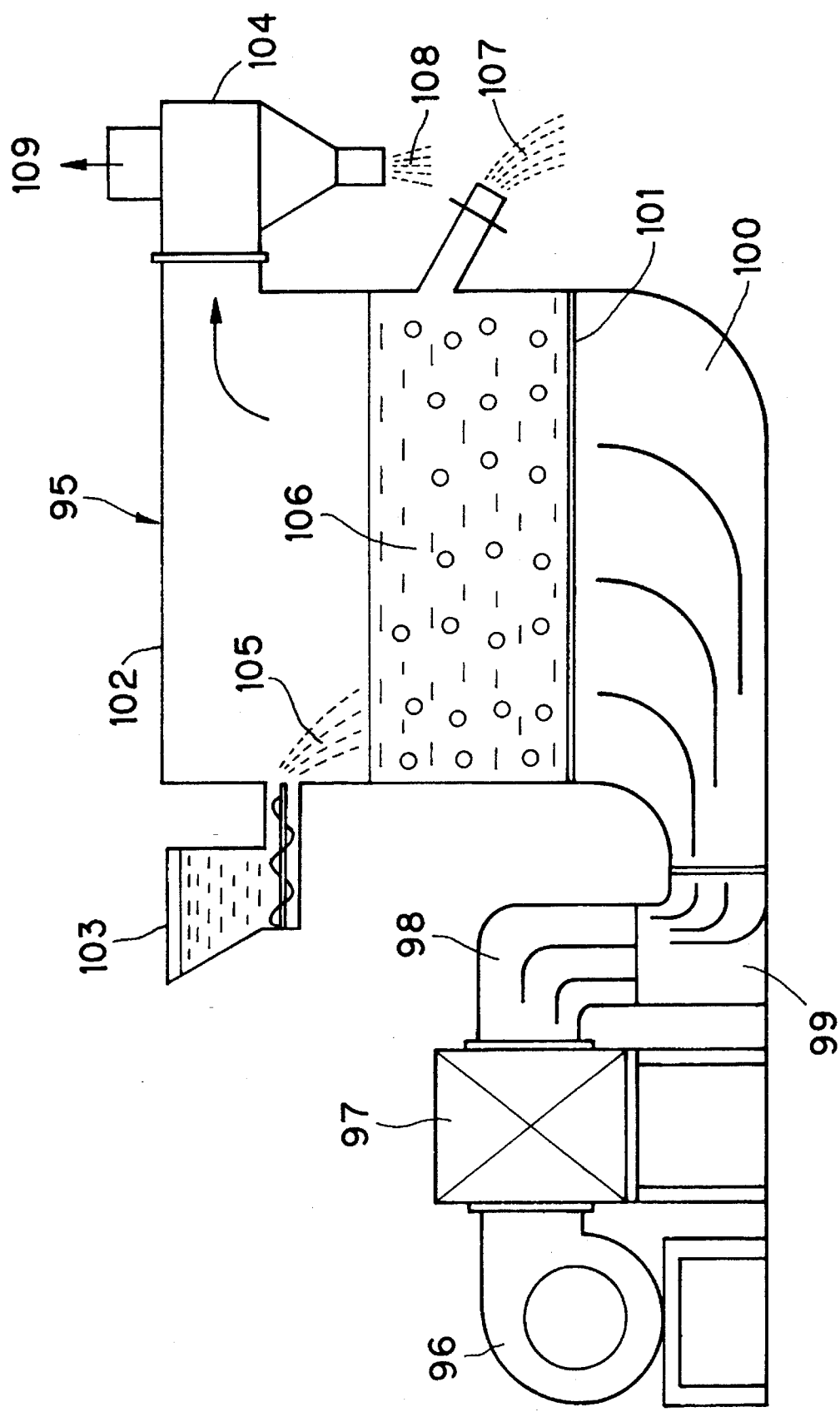
FIG. 18 is a front sectional view of a fluidized bed dryer in accordance with the thirteenth embodiment of the present invention.

FIG. 18 shows a fluidized-bed dryer 95 which has a fan 96, a heater (cooler) 97, a first elbow 98, a second T-shaped elbow 99, a third elbow 100, which elbows are provided with guide vanes in accordance with the present invention, a gas dispersing plate 101 having a large opening ratio, a fluidized-bed chamber 102, a feedstock supplier 103, and a separator 104.

In the fluidized-bed dryer 95, an air flow of uniform velocity distribution produced in elbows 98–100 is led into the fluidized-bed chamber 102 through the dispersing plate 101. Wet powder feedstock 105 is supplied from the feedstock supplier 103 into the fluidized-bed chamber 102. A fluidized-bed 106 of the wet powder feedstock 105 is formed in the fluidized-bed chamber 102. The dried powder feedstock 105 is taken out as a product 107 directly from the fluidized-bed chamber 102. The air which passes through the fluidized-bed 106 and the dried powder feedstock 105 entrained thereby are led into the separator 104. The dried powder feedstock 105 is separated in the separator 102 and discharged from the separator 104 as a product 108. The air is discharged from the separator 104 as exhaust 109.

In the conventional fluidized-bed dryer, the velocity distribution of the outlet air flow from the wind box (elbow) below the gas dispersing plate is uneven. Thus, a gas dispersing plate with a small opening ratio is used for straightening the uneven air flow and making the distribution of the air bubbles above the dispersing plate uniform. Since gas dispersing plate has a small opening ratio and high pressure loss, the straightened air flow blowing through the gas dispersing plate has a very large velocity. As a result, the air bubbles gather around the center line of the fluidized-bed owing to the effect of the side walls of the fluidized-bed chamber. Thus, the fluidized-bed stagnates near the side walls of the fluidized-bed chamber. This phenomenon has been a major cause for technological difficulties in the combustion chambers, dryers, reactors, etc. which use fluidized-beds.

In the fluidized-bed dryer 95, the wind box below the gas dispersing plate 101 is constituted by the elbow 100 provided with guide vanes in accordance with the present invention, so that a straightened outlet air flow with uniform velocity distribution can be blown from the wind box vertically onto the gas dispersing plate 101. Thus, even though the opening ratio of the gas dispersing plate 101 is large, the distribution of the air bubbles above the gas dispersing plate 101 becomes uniform. Because of the adoption of the gas dispersing plate 101 having a large opening ratio, the air flow blowing through the gas dispersing plate 101 does not have a large velocity. Thus, the air bubbles in the fluidized-bed 106 become uniform and no stagnant region is generated in the fluidized-bed 106.

While the present invention has been described with reference to the preferred embodiments, one of ordinary skill in the art will recognize that modifications and improvements may be made while remaining within the spirit and scope of the present invention. The scope of the present invention is determined solely by the appended claims.

TABLE 1

| | | elbow No. | | | |
|---|---|---|---|---|---|
| | | 1 | 2 | 3 | 4 |
| type of elbow | type | normal | normal | expansion | expansion |
| | enlargement ratio "f" | 1 | 1 | 2 | 4 |
| | number of guide vanes | 0 | 2 | 3 | 3 |
| | aspect ratio of sub-channel "r" | — | 0.42 | 0.73 | 0.90 |
| state of air flow at inlet of elbow | flow velocity (m/s) | 8.0 | 8.0 | 8.0 | 8.0 |
| | dynamic pressure (mmAq) | 3.9 | 3.9 | 3.9 | 3.9 |
| state of air flow at outlet | flow velocity (m/s) | 8.0 | 8.0 | 4.0 | 2.0 |
| | dynamic pressure | 3.9 | 3.9 | 0.98 | 0.25 |

TABLE 1-continued

| | elbow No. | | | |
|---|---|---|---|---|
| | 1 | 2 | 3 | 4 |
| of elbow (mmAq) | | | | |
| dynamic pressure recovery (mmAq) | 0.0 | 0.0 | 2.9 | 3.7 |
| pressure loss coefficient "k" | 1.2 | 0.4 | 0.7 | 0.8 |
| pressure loss "Δh" (mmAq) | 4.7 | 1.6 | 2.7 | 3.1 |
| relative static pressure at the inlet of the elbow (mmAq) | 4.7 | 1.6 | −0.2 | −0.6 |

Note:
① elbow No. 1 is a conventional right-angled elbow, while elbows No.2 to 4 are those provided with guide vanes in accordance with the present invention
② crossing angle between the outlet flow and the outlet plane is 90°
③ temperature of the air 20° C.
④ mmAq: water head (mm)
⑤ $\Delta h = k\gamma (V^2/2g)$
k: pressure loss coefficient
γ: specific gravity of the air (kg/m$^3$) (1.2 kg/m$^3$ at 20° C.)
V: flow velocity at the inlet of the elbow (m/s)
g: acceleration of gravity (m/s$^2$)

I claim:

1. An elbow provided with guide vanes wherein the guide vanes are disposed to make the shapes of sub-channels defined thereby similar to each other and the shape of the sub-channels are determined based on the following formulas:

$$P_0 = h/\{[f/(f-r)]^m - 1\} \quad (1)$$

$$a_n = P_0 r[f/(f-r)]^n \quad (2)$$

$$b_n = a_n/f \quad (3)$$

h: inlet breadth of the elbow
$P_0$: overhang length of the guide vanes at the outlet of the elbow
f: enlargement ratio of the elbow expressed by outlet breadth/inlet breadth
r: aspect ratio of the sub-channels (r<f)
m: number of sub-channels
$a_n$: outlet breadth of n-th sub channel ($a_n$ indicates the radius of curvature of the inner side wall when n=0 and indicates radius of curvature of the outer side wall when n=m)
$b_n$: inlet breadth of n-th sub-channel.

2. An elbow provided with guide vanes of claim 1 wherein the enlargement ratio "f" is in the range 5≧f>1.

3. An elbow provided with guide vanes of claim 1 wherein the enlargement ratio "f" is 1.

4. An elbow provided with guide vanes of claim 1 wherein the enlargement ratio "f" is in the range 1>0.4.

5. An elbow of any one of claims 1 to 4, wherein sectional shapes of the inlet and the outlet of the elbow are rectangles with the same depth.

6. An elbow of any one of claims 1 to 4, wherein sectional shapes of the inlet and the outlet of the elbow are circles.

7. An elbow of any one of claims 1 to 4 comprising an L-shaped elbow having two elbows, wherein said two elbows are disposed in tandem such that a plane defined by a streamline of one of said elbows crosses at a right angle with a plane defined by a streamline of the other of said elbows.

8. An elbow of any one of claims 1 to 4 comprising a T-shaped elbow having a center elbow and a pair of L-shaped elbows symmetrically disposed on opposing sides of said center elbow, wherein each of said L-shaped elbows includes first and second elbows disposed in tandem such that a plane defined by a streamline of one of said first and second elbows crosses at a right angle with a plane defined by a streamline of the other of said first and second elbows.

9. An elbow of any one of claims 1 to 4, wherein the guide vanes are made of panels constituted of heat exchanger tubes.

* * * * *